US010387980B1

(12) United States Patent
Shahidzadeh et al.

(10) Patent No.: US 10,387,980 B1
(45) Date of Patent: Aug. 20, 2019

(54) METHOD AND SYSTEM FOR CONSUMER BASED ACCESS CONTROL FOR IDENTITY INFORMATION

(71) Applicants: Nahal Shahidzadeh, Portland, OR (US); Haitham Akkary, Portland, OR (US)

(72) Inventors: Nahal Shahidzadeh, Portland, OR (US); Haitham Akkary, Portland, OR (US)

(73) Assignee: Acceptto Corporation, Portland, OR (US)

( * ) Notice: Subject to any disclaimer, the term of this patent is extended or adjusted under 35 U.S.C. 154(b) by 0 days.

(21) Appl. No.: 15/174,989

(22) Filed: Jun. 6, 2016

Related U.S. Application Data

(60) Provisional application No. 62/171,288, filed on Jun. 5, 2015.

(51) Int. Cl.
*G06Q 40/00* (2012.01)
*G06Q 50/26* (2012.01)
(Continued)

(52) U.S. Cl.
CPC ........... *G06Q 50/265* (2013.01); *G06Q 40/02* (2013.01); *G06Q 40/123* (2013.12); *H04L 63/08* (2013.01); *H04L 63/10* (2013.01); *H04L 63/20* (2013.01)

(58) Field of Classification Search
CPC .................................................. G06Q 40/00
(Continued)

(56) References Cited

U.S. PATENT DOCUMENTS 6,636,721 B2 * 10/2003 Threadgill ......... H04B 7/18506
455/12.1
6,850,497 B1 * 2/2005 Sigler .................. H04B 7/1853
370/310
(Continued)

OTHER PUBLICATIONS

"Contextual Intelligence" Harvard Business Review by Tarun Khanna Sep. 2014 (Year: 2014).*

*Primary Examiner* — Bruce I Ebersman
(74) *Attorney, Agent, or Firm* — Roark IP

(57) ABSTRACT

A computer implemented system and method for a consumer based access control for identity information. The method and system involve receiving at an identity organization a request for registration and verification of the identity information and configuring a specific user selected policy for notification and authorization of such identity requests of a desired (or intended) identity service (or plurality of services) associated with the targeted user identification. Next, processing the request in a Joint Identity Information Service Network (JIISN) server framework for the detection and verification of a request against an active directory of users or organizations who have opted in for notification; computing the required action based on the configuration of the policies in one of the group consisting of: a JISN policy engine and a user remote mobile control system; communicating with a real time authorization server (e.g., eGuardian™) which in part identifies the registered authorizing party including delivering notification for the identity services requested by the user based on the JISN policy engine setting through the agency or organization Identity System Service (e.g., It'sMe™ service) and alternatively user mobile rules; automatic rejection (or lock down of the Identity or data), automatic approval or real time authorization delivering the request authorization through a secure communication network back to a joint identity network
(Continued)

service comprised of a plurality of government or private identity and credit report services; and determining if a user is to be verified using a second or multi factor authenticating service.

18 Claims, 12 Drawing Sheets

(51) Int. Cl.
*H04L 29/06* (2006.01)
*G06Q 40/02* (2012.01)

(58) Field of Classification Search
USPC .......................................................... 705/37
See application file for complete search history.

(56) References Cited

U.S. PATENT DOCUMENTS

| | | | |
|---|---|---|---|
| 7,243,369 B2 | 7/2007 | Bhat | |
| 7,395,435 B2 * | 7/2008 | Benhammou | G06F 12/1458 |
| | | | 711/E12.093 |
| 7,584,152 B2 | 9/2009 | Gupta | |
| 7,721,322 B2 | 5/2010 | Sastry | |
| 7,962,419 B2 | 6/2011 | Gupta | |
| 7,971,062 B1 | 6/2011 | Hughes et al. | |
| 8,127,142 B2 | 2/2012 | Cuppett | |
| 8,127,982 B1 | 3/2012 | Casey | |
| 8,205,249 B2 | 6/2012 | Meister et al. | |
| 8,261,089 B2 | 9/2012 | Cobos et al. | |
| 8,346,924 B1 | 1/2013 | Bucher et al. | |
| 8,423,476 B2 | 4/2013 | Bishop | |
| 8,457,781 B2 * | 6/2013 | Bailey | B07C 3/00 |
| | | | 700/224 |
| 8,510,797 B2 | 8/2013 | Kasturi | |
| 8,510,811 B2 | 8/2013 | Kuang et al. | |
| 8,516,542 B2 | 8/2013 | Lerner | |
| 8,572,714 B2 | 10/2013 | Radhakrishnan | |
| 8,612,357 B2 | 12/2013 | Phillips | |
| 8,615,562 B1 | 12/2013 | Huang | |
| 8,756,661 B2 | 6/2014 | Levenberg | |
| 8,776,204 B2 | 7/2014 | Faynberg et al. | |
| 8,831,677 B2 * | 9/2014 | Villa-Real | H04M 1/66 |
| | | | 455/552.1 |
| 9,510,320 B2 * | 11/2016 | Reed | H04W 8/02 |
| 9,613,257 B2 * | 4/2017 | Phillips | G06K 9/00221 |
| 2003/0061111 A1 | 3/2003 | Dutta | |
| 2003/0115142 A1 | 6/2003 | Brickell et al. | |
| 2004/0155101 A1 | 8/2004 | Royer et al. | |
| 2005/0060584 A1 | 3/2005 | Ginter | |
| 2005/0102530 A1 * | 5/2005 | Burrows | G06F 21/6218 |
| | | | 726/1 |
| 2007/0011066 A1 | 1/2007 | Steeves | |
| 2007/0033136 A1 | 2/2007 | Hu | |
| 2007/0156611 A1 | 7/2007 | Gupta | |
| 2007/0262136 A1 | 11/2007 | Ou | |
| 2008/0101283 A1 * | 5/2008 | Calhoun | H04L 63/10 |
| | | | 370/328 |
| 2009/0132808 A1 | 5/2009 | Baentsch et al. | |
| 2009/0259838 A1 | 10/2009 | Lin | |
| 2009/0307135 A1 | 12/2009 | Gupta | |
| 2010/0228996 A1 | 9/2010 | Ginter et al. | |
| 2011/0035788 A1 | 2/2011 | White et al. | |
| 2011/0086612 A1 | 4/2011 | Montz et al. | |
| 2011/0093927 A1 | 4/2011 | Leppanen | |
| 2011/0173017 A1 | 7/2011 | Salonen | |
| 2011/0173448 A1 | 7/2011 | Baentsch et al. | |
| 2011/0204142 A1 * | 8/2011 | Rao | G06Q 10/06 |
| | | | 235/380 |
| 2011/0288996 A1 | 11/2011 | Kreutz et al. | |
| 2011/0296513 A1 | 12/2011 | Kasad | |
| 2011/0307949 A1 | 12/2011 | Ronda et al. | |
| 2012/0117157 A1 | 5/2012 | Ristock | |
| 2012/0192260 A1 | 7/2012 | Kontsevich | |
| 2012/0330788 A1 | 12/2012 | Hanson et al. | |
| 2013/0007849 A1 | 1/2013 | Coulter | |
| 2013/0047202 A1 | 2/2013 | Radhakrishnan | |
| 2013/0047213 A1 | 2/2013 | Radhakrishnan et al. | |
| 2013/0111549 A1 | 5/2013 | Sowatskey | |
| 2013/0185205 A1 | 7/2013 | Boss et al. | |
| 2013/0205133 A1 | 8/2013 | Hess | |
| 2013/0298242 A1 | 11/2013 | Kumar et al. | |
| 2013/0305322 A1 | 11/2013 | Raleigh | |
| 2014/0040975 A1 | 2/2014 | Raleigh | |
| 2014/0189808 A1 | 7/2014 | Mahaffey | |
| 2014/0189809 A1 | 7/2014 | Koved et al. | |
| 2014/0189840 A1 | 7/2014 | Metke et al. | |
| 2014/0304795 A1 | 10/2014 | Bruno et al. | |

\* cited by examiner

METHOD AND SYSTEM FOR CONSUMER BASED ACCESS CONTROL FOR IDENTITY INFORMATION

CROSS-REFERENCE TO RELATED PATENT APPLICATIONS

This application claims the priority benefit of U.S. Provisional Patent Application Ser. No. 62/171,288, filed Jun. 5, 2015 and entitled "Method and System For Consumer Based Access Control For Identity Information". This application is specifically incorporated by reference in its entirety.

FIELD OF THE INVENTION

The invention relates to the field of user identification and authorization to perform services with a secure service.

BACKGROUND

With the explosion of passwords and the ever increasing threat of online fraud, the need to improve authentication of users and their transactions enable or associated with their identity number such as Social Security Number (SSN), Employee Identification Number (EIN), and Driver License Number as well as the usability of relying party applications across multiple sectors (e.g., financial institutions, healthcare, retailers, education institutions, government agencies and associated social services, social networks, etc.) is essential to mitigate the occurrence of information security fraud on a global scale. Furthermore, current authentication and authorization schemes provide an all or nothing approach, where the user either has complete control of all the resources provided by the identity proofing such as name, SSN, and other personal information or none at all.

SUMMARY OF THE INVENTION

Aspects of the disclosure include a computer implemented method for a consumer based access control for identity information, the method comprising: receiving at an identity organization a request for registration and verification of the identity information and configuring a specific user selected policy for notification and authorization of such identity requests of a desired (or intended) identity service (or plurality of services) associated with the targeted user identification; processing the request in a Joint Identity and Information Service Network (JIISN) server framework for the detection and verification of a request against an active directory of users or organizations who have opted in for notification; computing the required action based on the configuration of the policies in one of the group consisting of: a JIISN policy engine and a user remote mobile control system; communicating with a real time authorization server (e.g., an AIISO such as eGuardian™) which in part identifies the registered authorizing party including delivering notification for the identity services requested by the user based on the JIISN policy engine setting through the agency or organization Identity System Service (e.g., It'sMe™ service) and alternatively user mobile rules; delivering the request authorization or declining in case of the lock of the SSN or passport number through a secure communication network back to a joint identity network service comprised of a plurality of government or private identity and credit report services; and determining if a user is to be verified using a second or multi factor authenticating service. Further aspects include the method of claim 1 wherein the organization receiving the registration request is either a private or public sector identity such as school or club member identification (ID), Social Security Number, Employee Identification Number (EIN), Driver License, Passport Number, or financial services related such as credit report, health identification, or student identification. The method of claim 1 wherein the policies in a JIISN policy engine may include a set policy from the group consisting of: automatic authorization, automatic rejection, lock for duration of time, on demand real-time authorization, and on demand real-time notification. The method of claim 1, wherein the policies in a JIISN policy engine may include sets of policies from the group consisting of: automatic authorization, automatic rejection, lock for duration of time, on demand real-time authorization, and on demand real-time notification. The method of claim 1 wherein the user can be an organization (e.g., in the case of EIN for a corporation it can be users; in the case of W2 verification, the employer sends notifications and files W-2 for 100,000 employees and all registered employees get a notification and they may not be required to authorize or may have a certain amount of time to report fraudulent activities). The method of claim 1 wherein the configuration of the policies for computing the required action based on the configuration of the policies in the JISN policy engine can be set by the plurality of the user remote mobile control systems such as use of a smart device as a universal remote control. The method of claim 1 wherein the JIISN can manage a plurality of agencies and private companies. The method of claim 1 wherein the JIISN policy engine manages each policy per organization (e.g., government agency or private company) and per identity or data field. The method of claim 1 where in the JIISN policy engineer can provide other requested events, verifications, and services targeted for other agencies as well as providing to the consumer or organization an early warning and report the failed versus successful attempts.

Aspects of the disclosure further include a computer implemented method for a consumer based access control for identity information for Internal Revenue Service (IRS) tax filings and disbursements, the method comprising: receiving at the IRS a request for registration and verification of the identity information and configuring a specific user selected policy for notification and authorization of such identity requests of a desired (or intended) identity service (or plurality of services) associated with the targeted user identification; processing the request in a Joint Identity and Information Service Network (JIISN) server framework for the detection and verification of a request against an active directory of users or organizations who have opted in for notification; receiving at the IRS from the user a tax filing; computing the required action based on the configuration of the policies in one of the group consisting of: a JIISN policy engine and a user remote mobile control system; communicating with a real time authorization server (e.g., eGuardian™) which in part identifies the registered authorizing party including delivering notification for the identity services requested by the user based on the JIISN policy engine setting through the IRS Identity System Service (e.g., It'sMe™ service); delivering the request authorization through a secure communication network back to a joint identity network service comprised of a plurality of government or private identity and credit report services; determining if the user is to be verified using a second or multi factor authenticating service; and if verified, disburse tax refund to the user. The method of claim 10 wherein the policies in a JIISN policy engine may include a set policy from the group consisting of: automatic authorization, automatic rejection, lock for duration of time, on demand real-time authorization, and on demand real-time notification. The method of claim 10, wherein the policies in a JIISN policy engine may include sets of policies from the group consisting of: automatic authorization, automatic rejection, lock for duration of time, on demand real-time authorization, and on demand real-time notification. The method of claim 10 wherein the user can be an organization (e.g., in the case of EIN for a corporation it can be officers of the company responsible for filing; in the case of W2 verification, the employer sends notifications and files W-2 for 100,000 employees and all registered employees get a notification and they may not be required to authorize or may have a certain amount of time to inform of fraud). The method of claim 10 wherein the configuration of the policies for computing the required action based on the configuration of the policies in the JIISN policy engine can be set by the plurality of the user remote mobile control systems such as use of a smart mobile device as a universal remote control. The method of claim 10 wherein the JISN can manage a plurality of agencies and private companies. The method of claim 1 wherein the JISN policy engine manages each policy per organization (e.g. government agency or private company) and per identity or data field. The method of claim 1 wherein the JIISN can provide other requested events, verifications, and services targeted for other agencies as well as the consumer or organization an early warning and report the failed versus successful attempts.

Aspects of the disclosure further include a computer implemented method for an organization based access control for identity information for one of a group of identity organizations consisting of: Medicaid, Student Identification, Medicare, E-VERIFY, SSNVS, Department of Motor Vehicles (DMV), State Department Passport Issuance Service, and Credit Reporting Agencies, DHS, KAISER, Aetna, CIGNA, Humana, ADP, JP Morgan, Fidelity, the method comprising: receiving at one of the identity organizations a request for registration and verification of the identity information and configuring a specific user selected policy for notification and authorization of such identity requests of a desired (or intended) identity service (or plurality of services) associated with the targeted user identification; processing the request in a Joint Identity and Information Service Network (JIISN) server framework for the detection and verification of a request against an active directory of users or organizations who have opted in for notification; computing the required action based on the configuration of the policies in one of the group consisting of: a JIISN policy engine and a user remote mobile control system; communicating with a real time authorization server (e.g., an AIISO such as eGuardian™) which in part identifies the registered authorizing party including delivering notification for the identity services requested by the user based on the JIISN policy engine setting through the one of the identity organizations Identity System Service (e.g., It'sMe™ service) and alternatively user mobile rules; delivering the requested authorization through a secure communication network back to a joint identity network service comprised of a plurality of government or private identity and credit report services; and determining if a user is to be verified using a second or multi factor authenticating service. The method of claim 18 wherein the policies in a JIISN policy engine may include a set policy from the group consisting of: automatic authorization, automatic rejection, lock for duration of time, on demand real-time authorization, and on demand real-time notification. The method of claim 18, wherein the policies in a JIISN policy engine may include sets of policies from the group consisting of: automatic authorization, automatic rejection, lock for duration of time, on demand real-time authorization, and on demand real-time notification. The method of claim 18 wherein the user can be an organization (e.g., in the case of EIN for a corporation it can be users; in the case of W2 verification, the employer sends notifications and files W-2 for 100,000 employees and all registered employees get a notification and they may not be required to authorize or may have a certain amount of time to inform of fraud). The method of claim 18 wherein the configuration of the policies for computing the required action based on the configuration of the policies in the JIISN policy engine can be set by the plurality of the user remote mobile control systems such as a universal remote control. The method of claim 18 wherein the JIISN can manage a plurality of agencies and private companies. The method of claim 18 wherein the JIISN policy engine manages each policy per organization (e.g. government agency or private company) and per identity or data field. The method of claim 18 where in the JIISN can provide other requested events, verifications, and services targeted for other agencies as well as the consumer or organization an early warning and report the failed versus successful attempts.

Aspects of the disclosure further include a computer implemented method for an organization based access control for identity information, the method comprising: receiving at a plurality of identity organizations a request for registration and verification of the identity information and configuring a specific organization selected policy for notification and authorization of such identity requests of a desired (or intended) identity service (or plurality of services) associated with the targeted user identification, wherein the identity information is the Employee Identification Number (EIN); processing the request in a Joint Identity and Information Service Network (JIISN) server framework for the detection and verification of the request against an active directory of organizations who have opted in for notification; computing the required action based on the configuration of the policies in one of the group consisting of: a JISN policy engine and a user remote mobile control system; communicating with a real time authorization server (e.g., an AIISO such as eGuardian™) which in part identifies the registered authorizing parties including delivering notification for the identity services requested by the organization based on the JIISN policy engine setting through the organization Identity System Service (e.g., It'sMe™) and alternatively user mobile rules, wherein the authorizing parties include a CEO and CFO of the organization; delivering the requested authorization through a secure communication network back to a joint identity network service comprised of a plurality of government or private identity and credit report services; and determining if the organization is to be verified using a second or multi factor authenticating service. The method of claim 26 wherein the policies in a JIISN policy engine may include a set policy from the group consisting of: automatic authorization, automatic rejection, lock for duration of time, on demand real-time authorization, and on demand real-time notification. The method of claim 26, wherein the policies in a JIISN policy engine may include sets of policies from the group consisting of: automatic authorization, automatic rejection, lock for duration of time, on demand real-time authorization, and on demand real-time notification. The method of claim 26 wherein the user can be an organization (e.g., in the case of EIN for a corporation it can be users; in the case of W2 verification, the employer sends notifications and files W-2 for 100,000 employees and all registered employees get a notification and they may not be required to authorize or may have a certain amount of time to inform of fraudulent activity). The method of claim 26 wherein the configuration of the policies for computing the required action based on the configuration of the policies in the JIISN policy engine can be set by the plurality of the user remote mobile control systems such as a mobile smart device as a universal remote control. The method of claim 26 wherein the JIISN can manage a plurality of agencies and private companies. The method of claim 26 wherein the JISN policy engine manages each policy per organization (e.g. government agency or private company). and per identity or data field. The method of claim 26 where in the JIISN can provide other requested events, verifications, and services targeted for other agencies as well as the consumer or organization an early warning and report the failed versus successful attempts.

Aspects of the disclosure further include a computer implemented method for consumer based access control for identity information of a minor child or a mentally ill person, the method comprising: receiving at an identity organization a request for registration and verification of the identity information and configuring a specific organization selected policy for notification and authorization of such identity requests of a desired (or intended) identity service (or plurality of services) associated with the targeted user identification; processing the request in a Joint Identity and Information Service Network (JISN) server framework for the detection and verification of the request against an active directory of organizations who have opted in for notification; computing the required action based on the configuration of the policies in one of the group consisting of: a JISN policy engine and a user remote mobile control system; communicating with a real time authorization server (e.g., eGuardian™) which in part identifies the registered authorizing parties including delivering notification for the identity services requested by the organization based on the JISN policy engine setting through the organization Identity System Service (e.g., It'sMe™ service) (and alternatively user mobile rules), wherein the authorizing parties include a parent of a minor child or a guardian of a mentally ill person; delivering the requested authorization through a secure communication network back to a joint identity network service comprised of a plurality of government or private identity and credit report services; and determining if the user is to be verified using a second or multi factor authenticating service.

Aspects of the disclosure further include a system, comprising: a public or private identity and credit report server configured to be communicatively coupled with a network; a network with number of methods of communicating from a consumer's request or the agent of, receiving a request for identity verification and services associated with the transaction such as tax filing or change of address with the identity data store provider such as the Department of Homeland Security (DHS) E-Verify system; and performing verification based on policies that are configured by the plurality of the consumer and the agencies of interest and deciding to request for authorization, notification only or no action based on set of configured policies. The method of claim 1, wherein the user or organization who initiates a transaction in the joint identity and information service network and credit data store server receives the authorization in real time through an out of band notification and requests for real-time authorization using a multi factor authentication and authorization method. The method of claim 1, wherein the multifactor identification uses the eGuardian system or method or the authentication policy orchestration system or method. The method of claim 1 further comprising: receiving a request to obtain identity information and associated data consumer (or acting agents/ organization) initiating event requiring identity verification from a client or alternatively the client's agent via a communication network, where a transaction request for an identity transaction is initiated to provide identity proofing for the service associated to the request, directly delivered to the policy—account owner; and the request from a secure Joint Identity Service Network by the identity provider is sent to the identity owner who in turn determines if an authorization is to be issued depending on requirements for the transaction request based, at least in part, on a plurality of authorization policies. The method of claim 1, where an additional party or alternative party is configured to authorize in case of a minor or mentally ill person or representative of giver the authority to authorize on behalf of the data owner such as when an old SSN for a diseased person or someone who is in witness protection, the guardians are notified.

BRIEF DESCRIPTION OF THE DRAWINGS

Aspects of the embodiments of this disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

FIG. 1A shows a flow of an event demanding a service requiring identity verification, authorization and authentication (e.g., filing taxes with the IRS, credit applications).

DETAILED DESCRIPTION

Figure 1A:
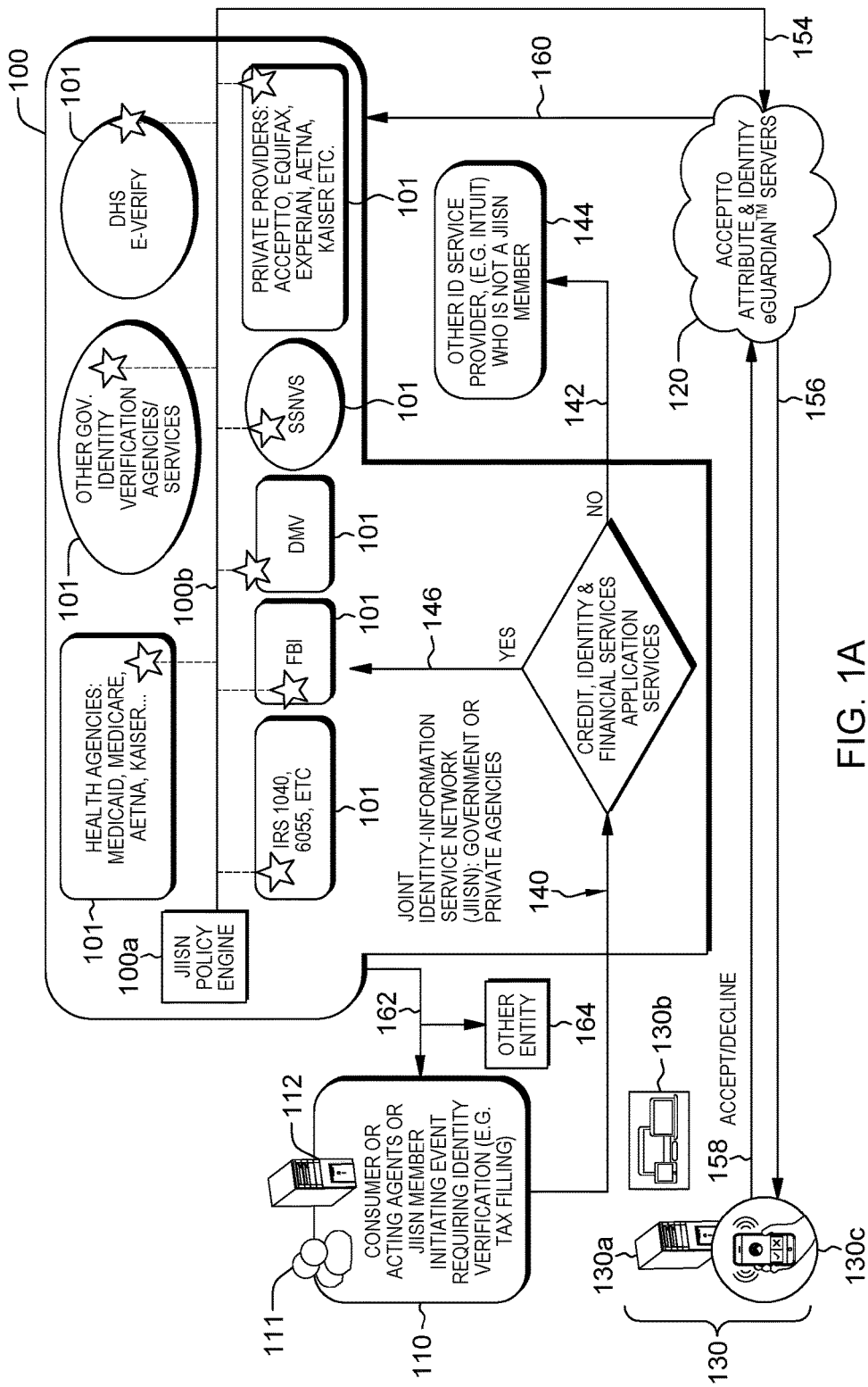
FIG. 1A illustrates an overall identity system service ecosystem covering a variety of government and consumer Electronic Identity Service Companies and agencies (collectively, ESICs). Specifically.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Below are exemplary definitions that are provided only for illustrative purposes in this disclosure below and should not be construed to limit the scope of the embodiments disclosed herein in any manner.

Contextual (or Contextual Factors): may be part of the authorizing party verification process and may include the following multi-factors used singularly or in different combinations: location, biometrics (e.g., heartbeat monitoring, iris recognition, fingerprint, voice analysis, deoxyribonucleic acid (DNA) testing), user habits, user location, spatial, body embedded devices, smart tattoos, dashboard of user's car, user's television (TV), user's home security digital fingerprint, Domain Name System (DNS), Virtual Private Network (VPN), and the like.

Real Time: the authorization time periods described herein range depending on the type of transaction and level of seriousness. The authorization time periods may vary from under 10 seconds to 24 hours or more. Real time authorization as used herein prevents fraud at its inception versus mitigating it in a post event notification. In one implementation, real time may refer to the time for the transaction to complete.

Data Commodity: data (or a plurality of data) that owners, investors, brokers, or interested users are in need of and may even be willing to buy or sell. Data Commodity just like other commodities such as physical commodities such as grain and sugar may have present and future value for different people in different locations. Alternatively, the Data Commodity might have personal value to the owner such as a will, photographs, and the like.

Data Owner: the owner and/or producer of a Data Commodity.

Electronic Identity Service Companies (EISC) (or Trusted Authorities or Relying Party): could be an entity in multiple sectors requiring secure interactions such as financial institutions, healthcare, retailers, education institutions, government agencies and associated social services, social networks, websites, et al. An EISC will typically use a server (e.g., a policy engine server) as a manifestation of its intentions.

Entity: throughout this disclosure consumer, user, user entity, entity, machine entity, user agent, client, client agent, subscriber, requesting agent, acting agent, Requesting Entity and Authorizing Entity may be human or machine. The entity with a particular identity can be trusted to actually be the claimant's "true" identity. Identity claims are made by presenting an identity credential to the AIISO 120 which will be discussed in detail herein. In the case where the entity is a person, this credential may take several forms, including but not limited to: (a) personally identifiable information such as name, address, birthdate, SSN, Member Identification etc.; (b) an identity proxy such a username, login identifier (user name), or email address; (c) some biometric identifiers such as fingerprint or voice, face, iris, etc.; (d) an X.509 digital certificate; and/or (e) a digital fingerprint and approval from a user-binded device.

Within the last few years data breaches and financial fraud across banking, retail, healthcare, education, industry and government sectors highlights the need for a change in direction and a new approach for dealing with fraudsters and hackers. Some of the recent and highly visible examples of data breaches and financial fraud include the following widely reported news stories:

- JP Morgan revealed a data breach affected 76 million households;
- Target confirmed a massive credit card data breach;
- Criminals stole 1.2 billion passwords;
- Tax return fraud approaching $21 billion and there's little the Internal Revenue Service (IRS) can do about it;
- University of Maryland testified to Congress on massive data breach; and
- Community Health Systems was hacked via the Heartbleed vulnerability.

The current reported estimates for the cost of tax refund fraud by 2016 alone indicate that there will be an immediate and measurable impact benefit to the U.S. government and consumers to take advantage of real-time authorization (e.g., the eGuardian™ authorization framework) which may be integrated into the electronic identity service companies or agencies such as Internal Revenue Service (IRS), the Social Security Administration, and other private or government agencies which distribute benefits and/or funds as described herein. The system and method of this disclosure also may be used for authentication by owners of any transactions involving SSNs, thus leading to a drastic reduction in identity theft that could result from data breaches of consumers' personal information electronically stored all over the world. The disclosed method and system allow for a central, secure place where the public and private sectors can work together to protect consumers.

FIG. 1A illustrates an overall identity system service ecosystem covering a variety of government and consumer electronic identity service companies and agencies. Joint Identity and Information Service Network (JIISN) 100 is a server framework of a plurality of linked trusted authorities or "electronic identity services companies" (EISCs) 101 for the detection and verification of an information request on a Authorizing Entity 130 against an active directory of users or organizations who have opted in for notification. The JIISN 100 members are trusted authorities 101 such as identity bureaus (e.g., Acceptto™), credit bureaus, independent third parties serving credit bureaus, banks, government agencies, insurance companies and health providers. The JIISN members 101 are connected to a JIISN policy engine 100a through electronic connections 100b which monitors, updates and directs the plurality of trusted authorities 101. The JIISN 100 members may also broadly include users or companies conducting background checks, employment verifications, payroll related verification services (e.g., payroll, W-2), tax and/or IRS issues, and death and/or birth certificates to open a bank account. The trusted authorities 101 are typically linked in a secure network to form the JIISN 100. For exemplary purposes, FIG. 1A shows the JIISN 100 with the trusted authorities 101 in the network including health agencies such as Medicaid, Medicare, Kaiser; Internal Revenue Service (IRS); Federal Bureau of Investigation (FBI); Department of Motor Vehicles (DMV), Department of Homeland Security (DHS) E-Verify; Social Security Number Verification Service (SSNVS); and private providers such as Acceptto™ and Experian.

One advantage of the JIISN 100 disclosed herein is that it allows for multi-factor authentication (MFA) as opposed to just single factor authentication. Single factor authentication in the context of logins methods include using just a username and password to gain access to data. Multi-factor Authentication refer to where the release of data by a Data Owner and/or Authorizing Entity to a Requesting Entity is to present two or more independent pieces of information (something beyond the username and password in the context of login) as means of authentication such as the following: something only the Data Owner (or agent) knows (e.g. password, PIN, pattern); something only the Data Owner (or agent) has (e.g. smart card, key fob, mobile phone); something only the Data Owner (or agent) body has (e.g. biometric such as fingerprint, face or voice); and/or some unique Contextual Factors associated with the Data Owner (or agent) (e.g. location, known device token, known connection network, etc.). In the context of identity the use of one's identity needs to be authenticated and authorized by the actual owner of the identity and the equivalent single factor to the login world is awareness and knowledge of the name and SSN to confirm transaction desired for that specific name and SSN. Where the MFA in this context is the need for verification of the SSN via some other factor such as something the owner has and is (e.g., smart phone and owner biometrics). The number and the independency of the authentication factors are very important. More independent factors when implemented correctly implies higher probabilities that the presenter user entity (person or machine) of the identity is indeed the owner of the identity. The independent authentication factors may be instituted by the policies in an ESIC policy engine 101*d* or JIISN policy engine 100*a* as well as a mobile/web rule engine. The JIISN policy engine 100*a* manages each policy per organization (e.g., government agency or private company) and per identity or data field. The ESIC policy engine 101*d* or JIISN policy engine 100*a* may include a set policy (or sets of policies) including automatic authorization, automatic rejection, lock for duration of time, on demand real-time authorization, and on demand real-time notification. The configuration of the policies for computing the required action based on the configuration of the policies in the ESIC policy engine 101*d* or JIISN policy engine 100*a* can be set by a plurality of the user remote mobile control systems (e.g., mobile device 130*c*) such as a universal remote control or a set of contextual data associated with the Data Owner, the inquiring agent interested in the identity of Data Commodity including geolocation, habits, sequences of events, and other identifiers that can be analyzed and identity normalities vs. abnormalities associated with the transaction and parties involved. The ESIC 101 policy engine and JIISN policy engine 100*a* can manage a plurality of agencies and private companies and manages each policy per organization (e.g., government agency or private company). The ESIC 101 policy engine and JIISN policy engine 100*a* can provide other requested events, verifications, and services targeted for other agencies as well as the consumer or organization an early warning and report the failed attempts.

FIG. 1A illustrates a flow of an event demanding a service requiring identity verification, authorization, and authentication (e.g., filing taxes with the IRS, credit application). Reference numeral 110 represents a Requesting Entity which may be a "consumer of data", an acting agent, or a JIISN member entity 101. The Requesting Entity may be an individual 111 connecting through personal computer 112 (or a wireless device). As discussed below, in an alternative embodiment, the Requesting Entity may be a machine (e.g., server). In a first case, a consumer of data could be an individual needing the release of his/her own personal data such as tax information. In that case, the Requesting Entity makes a request to the IRS which is an EISC 101 in the JIISN 100. The IRS will require an authentication and authorization from the Requesting Entity 110 before releasing the information to the Requesting Entity 110. As will be discussed in detail below, the IRS will contact a secure attribute & identity information service organization (AIISO) 120 to obtain authentication for the IRS to release the personal data of the Requesting Entity. The AIISO 120 will then contact an Authorizing Entity 130 which has the ability to authorize release of the personal data. In this first case, the Requesting Entity 110 and the Authorizing Entity 130 are the same entity. Either or both of the Requesting Entity and Authorizing Party may actually each be machines (i.e., servers). In another case, the Requesting Entity 110 is a organization which is seeking a Data Commodity of the Authorizing Entity 130 but needs the Authorizing Entity 130 to approve the transfer of data to the Requesting Entity 110. In another case, the Requesting Entity 110 is an acting agent having the authority of the Data Owner. In this case, the Requesting Entity 110 could also be both the requestor and the Authorizing Entity 130. In a third case, the Requesting Entity could be one of the trusted authorities or JIISN member 101 itself. This would be the case of transfer of data between the JIISN members 101 themselves. The process could be done by an individual representative of the JIISN members 101 being the Requesting Entity 110. In an alternative embodiment, it may be done via machine-to-machine (M2M) and the Requesting Entity 110 is a JIISN member 101 itself. The Requesting Entity 110 can be a machine/server and the transaction can be a batch mode asking for information from other Trusted Authorities as SSN, Date of Birth (DOB), Driver's License Number, or the like. Batch mode processing is the execution of a series of jobs in a program on a computer automatically without manual intervention (non-interactive). Strictly speaking, it is a processing mode: the execution of a series of programs each on a set or "batch" of inputs, rather than a single input (which would instead be a custom job). In another case, instead of a person the Requesting Entity is an enterprise which asks for data from the JIISN 100 and again the enterprise can itself be a JIISN member. For example, the Federal Bureau of Investigation can ask for data from the IRS and the FBI machine/server or FBI system administrator initiating the request will get a machine-2-machine request or machine-2-person request to authenticate itself and for the transaction between two entities is completed post authentication and authorization. In same case the owner(s) of the identity, an individual (or individuals) may also be contacted and informed that the FBI is requesting the IRS to provide certain Data Commodities associated with them and as desired and set by the policies that the Data Owner can be also be a secondary authorizing or final party to authorize the data transfer vs. just a notification.

One aspect of the JIISN 100 system and method is that sometimes owners of data do not want government to track and prefer a third party to manage their data (i.e., Big Brother fear). Data owners will use a trusted authority (EISC) 101 to be able to verify their identity and inform when ones' identity is being used. The verification of consumer (or data owner) identity is done via the data owner's choice of identity verifying company and method of verification. The data owner chooses who vouches for them. Examples of vouching agencies may include the DMV, IRS, Department of Homeland Security, Acceptto™, Pacific Gas & Electric or AT&T. For example, if a data owner wants to open a bank account and states they are Jane Smith, here is my SSN and here is the verifier trusted authority (e.g., DMV with a AIISO plug-in) then the verifier trusted authority knows how to connect to a consumer through an AISSO (e.g., Acceptto ItsMe™). As discussed above, a trusted authority may be a private entity like Equifax or agencies like H&R Block™ that support the W2 form submission-verification and have access to the SSN databases associated with their clients. In alternative embodiments, the JIISN 100 method and system can be used in filing taxes and receiving disbursements; it may apply to multiparty authorizations, for example in case of filing taxes for a corporation both the Chief Financial Officer and Chief Executive Officer have to authorize the EIN information associated with the company; and in other cases it may apply where the requesting agent is parent of a minor child or guardian of a mentally ill dependent, etc. One type of an ESIC 101 would be a corporation who is processing data for a large group of people (e.g., employees). For example, in the case of W-2 verification, the employer sends notifications and submits W-2's for 100,000 employees and all registered employees get a notification which they may not be required to authorize or may have a certain amount of time to report fraud.

In many cases, if someone has your identity they can act on your behalf and initiate services and transactions as you. For example if someone has your SSN they can apply for a job using your SSN and collect a salary with your name and SSN or can file taxes on your behalf, or open a bank account or the like. The data commodity in the new era of data economy and the verification of the ownership and approved use of the data commodity of interest requires proper authentication and authorization managed by the system demonstrated in FIG. 1A. In general, to meet the needs of the data economy, features of the embodiments disclosed herein may include:
  a) data ownership which needs to be verified;
  b) data transfer which needs to be verified, authorized, and be auditable by the owner, recipients and auditors (just like the flow of currency in a banking system);
  c) user or enterprise sensitive data which needs to be stored in an encrypted format and when needed to be accessed or transferred the Data Owners need to be notified; and
  d) authorization which needs to be granted based on a set of rules and protocols that the JIISN 100 as described herein and its specialized hardware, software, secure and private network and associated sensory (physical and virtual) resolves automatically where possible and at the end authorized by the actual Data Owner.

FIG. 1A shows the Requesting Entity 110 in step 140 contacting the JIISN 100 (i.e., the JIISN policy engine 100*a*) to determine if a credit, identity, and financial services has application services in the JIISN 110. If not, in step 142, the Requesting Entity will proceed out of the JIISN 100 to another identification server provider 144 (e.g., Intuit) who is not a JIISN member. If yes, and it is determined in step 146 that the EISC 101 is a trusted authority 101 of the JIISN 100, the EISC 101 is contacted in step 146. If MFA is available at the EISC 101, the authentication and authorization process proceeds.

Figure 1B:
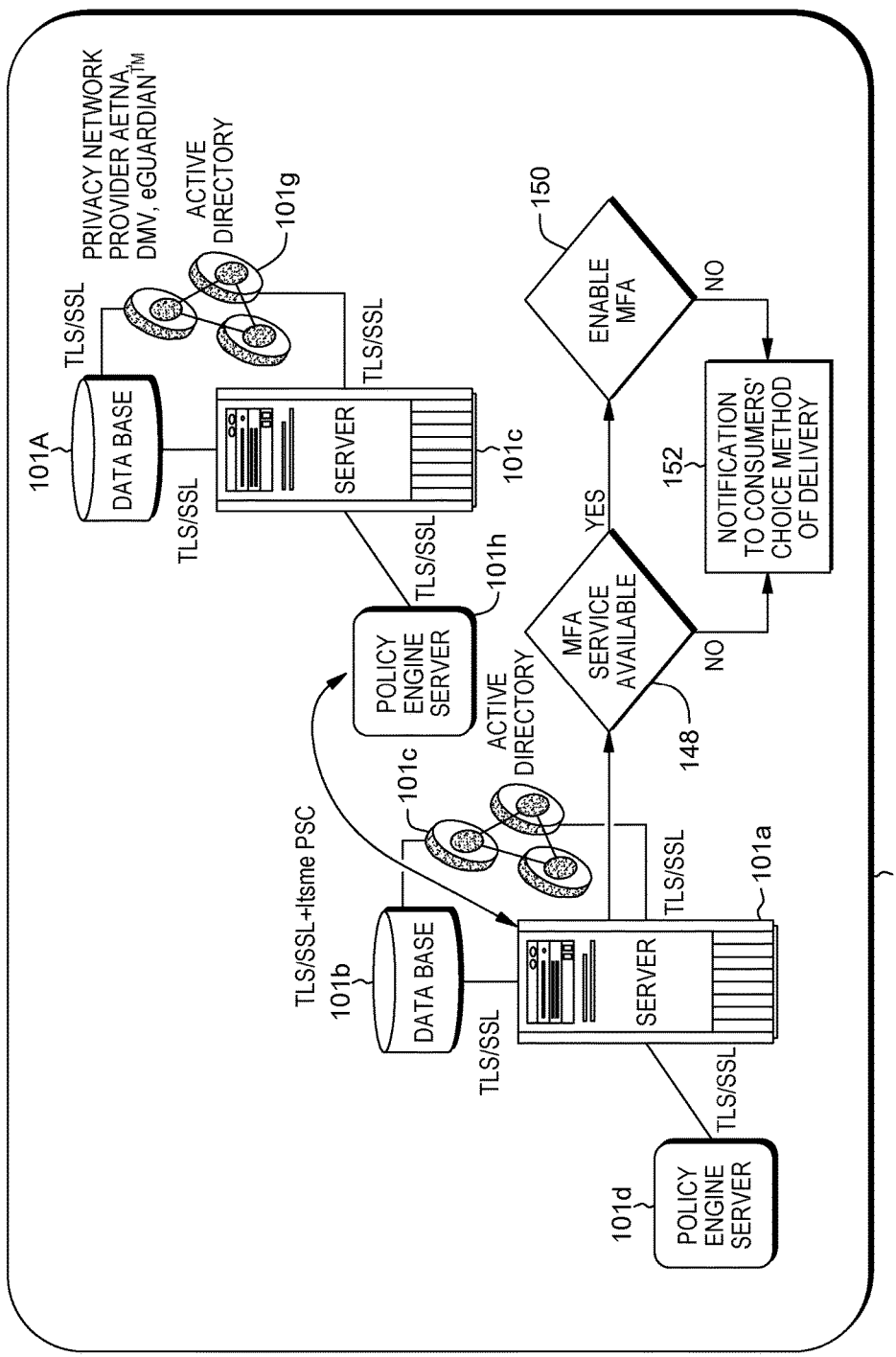
FIG. 1B illustrates a AIISO plug-in and hardware for the ESICs 101.

To process the authentication, each of the EISCs 101 have a plug-in provided by the AIISO 120 as indicated by the star representations in each of the EISCs 101. FIG. 1B shows details of an AIISO plug-in or private secure cloud present in each EISC 101. The AIISO plug-in will use the trusted authorities infrastructure. Reference 101*a* represents a server (or a series of servers) which are connected through secure communication links (e.g., Transport Layer Security (TLS)/Secure Sockets Layer (SSL) links to an encrypted database 101*b* and an active directory 101*c* of clients. The actions of the ESICs 101 are based on the configuration of policies in either one or a plurality of ESICs policy engines 101*d* or the JIISN policy engine(s) 100*a*. The ESICs policy engines 101*d* are either a plug-in to at least one of the ESIC servers 101*a* or are securely connected through a TLS/SSL link to the ESIC servers 101*a*. The actions of the ESICs 101 may also be based on the configuration policies of user entity remote mobile control systems which will be discussed in more detail below in the discussion of FIG. 1C A plurality of ESICs 101 in the JIISN 100 may leverage each other as an anchor of identity and verify with the data owner (or an organization for a single record or a batch of records) when their identity or data is requested to be used. The ESIC policy engines 101*d* and JIISN policy engine(s) 100*a* may include a plurality of set policies for user entity accounts such as automatic authorization, automatic rejection, lock for a duration of time, on-demand real-time authorization and on-demand real-time notification. The ESIC policy engines 101*d* are connected to the JIISN policy engine 100*a*. The ESIC servers 100*a*, ESIC policy engines 101*d* and/or JIISN policy engine(s) 100*a* can provide other requested events, verifications, and services targeted for other agencies as well as the consumer or organizations who have opted for an early warning and report of failed access attempts. The system and method described herein includes the ability to transfer, block, and suspend personal or enterprise data including both individual identity, organizational data, privileged knowledge and associated domain specific data (such as financial information, identity, SSN, patient health information, personal data, and enterprise sensitive data) from a data store source to another requiring data store destinations inquiring the desired data with a real time authorization and notification using a dedicated secure hardware, network and set of security protocols which enable verification of specific security protocols meeting the level of assurance required to automatically authorize (based on certain predetermined policies and contextual intelligence and trust relationships between the source and the destination) and real time notification and or approval of the data owner (can be person or can be enterprise). This enable authorization requests to the user identity such as social security, health, state ID, passport, etc in various government or private identity and credit data stores or transfer of data between two entities via a machine-2-machine (M2M) handshake and authentication and authorization where the data transfer is done upon verification of the endpoint server with the identity server and authorizing the data transfer between the two machines. Even in case of the machine-2-machine exchanges the two servers/devices authentication and authorization may go beyond machine-2-machine and require an out of band human authorization such as a system administrator who is ultimately the auditor for the M2M tasks. A good example is when data between two enterprise entity is to be exchanged and after securing the network and mutually authenticating the source and destination the system administrator, CFO, CEO or some other employee need to notified or even requested for authorization Referring to FIG. 1B, in step 148 a determination is made whether MFA is available. In particular, whether the data owner has activated an AIISO 120 MFA at the trusted authority 101 or at a third party. If not, the Requesting Entity 110 is notified. If yes, in step 150, the MFA is enabled and the Requesting Entity 110 is notified of that as well in step 152. If MFA is desired by the Data Owner 300, the authorization process begins. ESIC servers 101*a* are further connected through a secure TLS/SSL communication link to the AIISO plug-in. AIISO server 101*e* may be on-premises at the ESIC 101 location or may be cloud based. It may be connected to an encrypted database 101*f*, active directory 101*g* and AIISO policy engine server 101*h*. (Alternatively, the policy engine server 101*h* may be integrated into the AIISO server 101*e*). Referring back to FIG. 1A, in step 154, the authorization request is sent from the AIISO plug-in is coupled through a secure connection (e.g., TLS/SSL) to the secure attribute & identity service organization (AIISO) 120 itself (e.g., Acceptto's It'sMe™ identity service) which is configured for real-time authorization by Authorizing Parties 130. The AIISO 120 may be the eGuardian™ method and system as disclosed in U.S. patent application Ser. No. 14/672,098, having a filing date of Mar. 28, 2015, or the "authentication policy orchestration" method and system as disclosed in U.S. patent application Ser. No. 14/444,865, having a filing date of Jul. 28, 2014, both of which are hereby incorporated by reference in their entirety. Prior to receiving an authorization request, a data owner (or his/her authorized agent) (which may also be the Authorizing Entity 130) registers with the AIISO 120 from a server 130*a*, terminal 130*b* (e.g., personal computer) associated with an authorizing mobile device 130*c* (e.g., mobile phone, wireless tablet) or from the authorizing mobile device 130*c* itself. AIISO 120 provides delivery notification for the identity services requested by the Requesting Entity 110 through server 130*a*, terminal 130*b* or mobile device 130*c*. These delivery notifications are based on one of the ESIC policy engine 101*d* or JIISN policy engine settings. Either alternatively or additionally, the delivery notifications may be made by user mobile rules.

In step 156, an authorization request is sent to the Authorizing Entity 130 mobile device 130*c*. In step 158, the Authorizing Entity through the mobile device 130*c* either accepts or declines the release of the data. If approved, in step 160, the approval (or disapproval) notification is sent to the EISC 101 which contains the requested data. If approved, in step 162, the data is either released to the Requesting Entity 110 or to another third partyentity 164 as directed by the Requesting Entity, data owner, or Authorizing Entity.

Figure 1C:
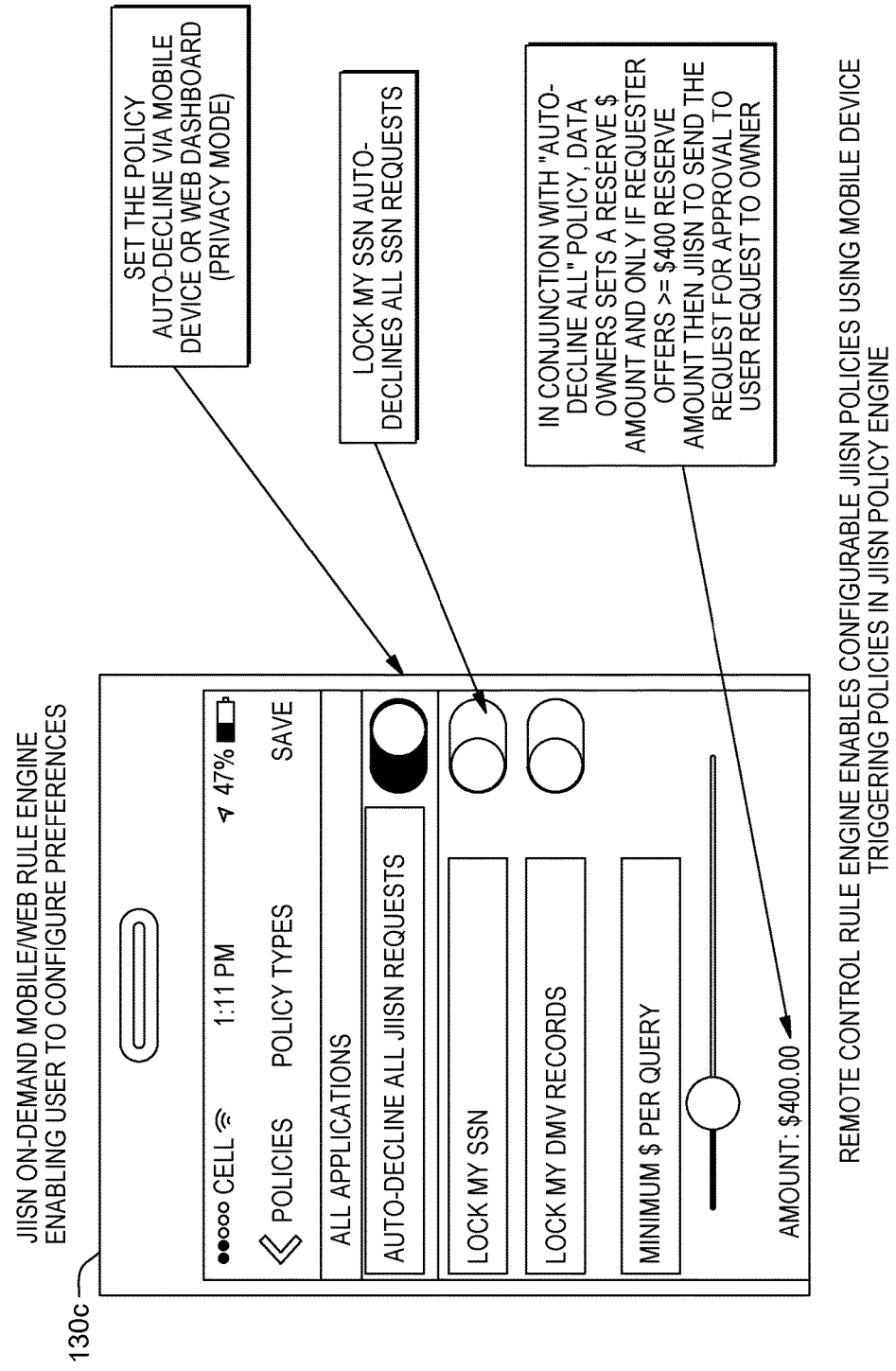
FIG. 1C illustrates a JIISN 100 on-demand mobile/web rule engine which enables the user to configure preferences remotely.

FIG. 1C illustrates a JIISN 100 on-demand mobile/web rule engine which enables the user to configure preferences from the Authorizing Entity 130 (and/or Data Owner 300) from either a server 130*a*, personal computer 130*b* and/or a mobile device 130*c*. FIG. 1C shows the screen of the mobile device 130*c* which has a remote control rule engine which enables configurable JIISN policies using mobile device triggering policies in the JIISN Policy Engine 100*a*. The app on the mobile device 130*c* allows for the setting the policy auto decline via the mobile device 130*c* or web dashboard (privacy mode). The SSN number of an Authorizing Entity 130 or data owner may be locked from the mobile device 130*c* and may decline all SSN requests. In conjunction with "Auto-Decline All" policy, data owner may set a server dollar amount and only requestor offers greater or equal to a set dollar amount then JIISN to send the request for approval to user request to owner.

Figure 1D:
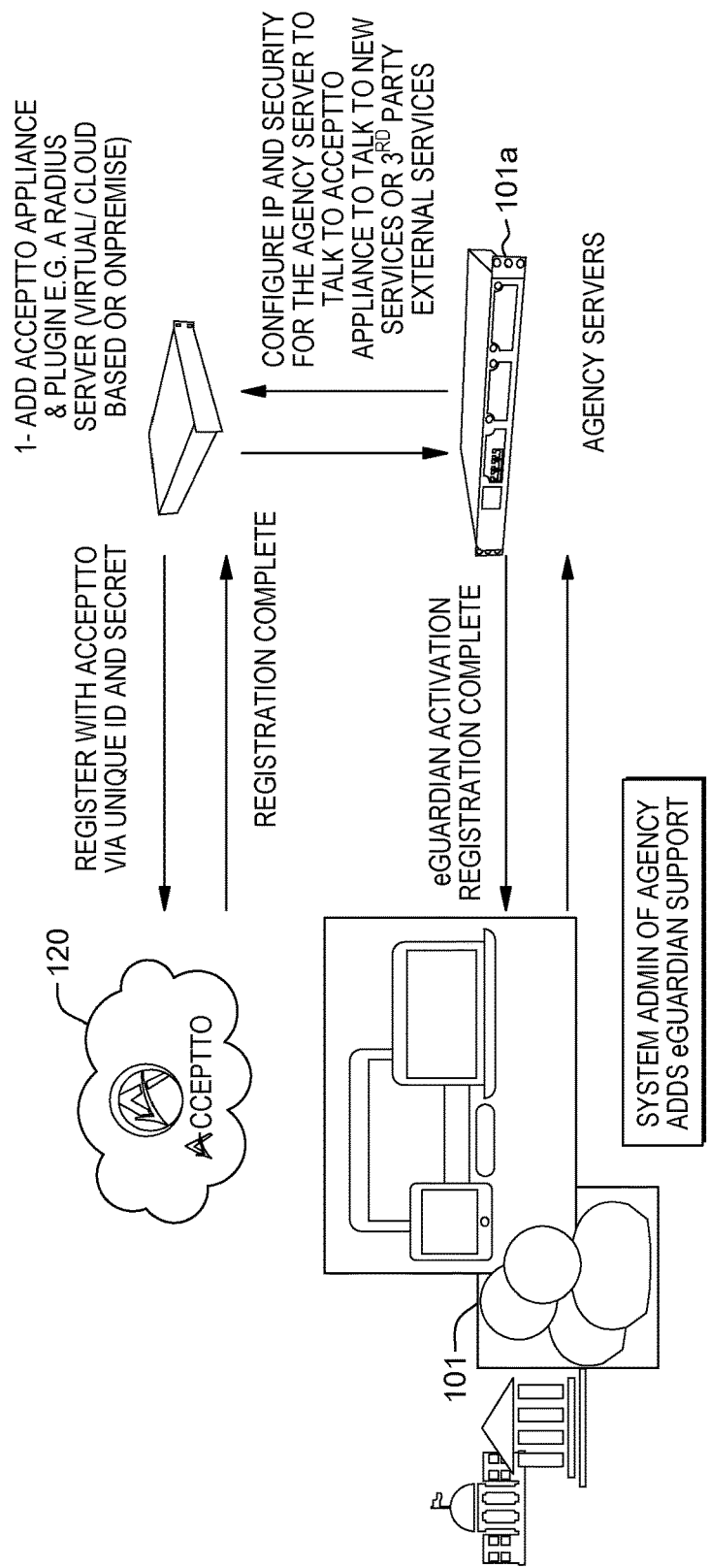
FIG. 1D illustrates how ESICs 101 (or JIISN policy engine) add an on-premises Attribute and Identity Information Service Organization (AIISO) server or AIISO plugin and appliance or cloud so they can securely notify user entities via their platform when their identity is requested for use.

FIG. 1D illustrates how ESICs 101 add an on-premises AIISO 120 server or AIISO plugin and appliance or cloud so they can notify user entities via their platform when their identity is used. Some trusted members 101 such as the Federal Bureau of Investigation or National Security Agency will need the appliance on premises for higher security while others such as a bank can use a cloud version. A system administrator at an ESIC 101 adds AIISO support to the server(s) 101*a*. The system administrator configures the Internet Protocol (IP) and security for the server(s) 101*a* to talk to a AIISO 120 server. AIISO 120 applicant and plugin is then added (e.g., a RADIUS server) which may be virtual/cloud based or on-premises. The ESIC 101 is then registered with the AIISO 120 via a unique identification and secret key. The AIISO 120 then activates the registration of the ESIC 101. The system provides for locking a SSN via a mobile web which can be a portal to make a first instance of a JIISN 100 or standalone plugin.

Figure 2:
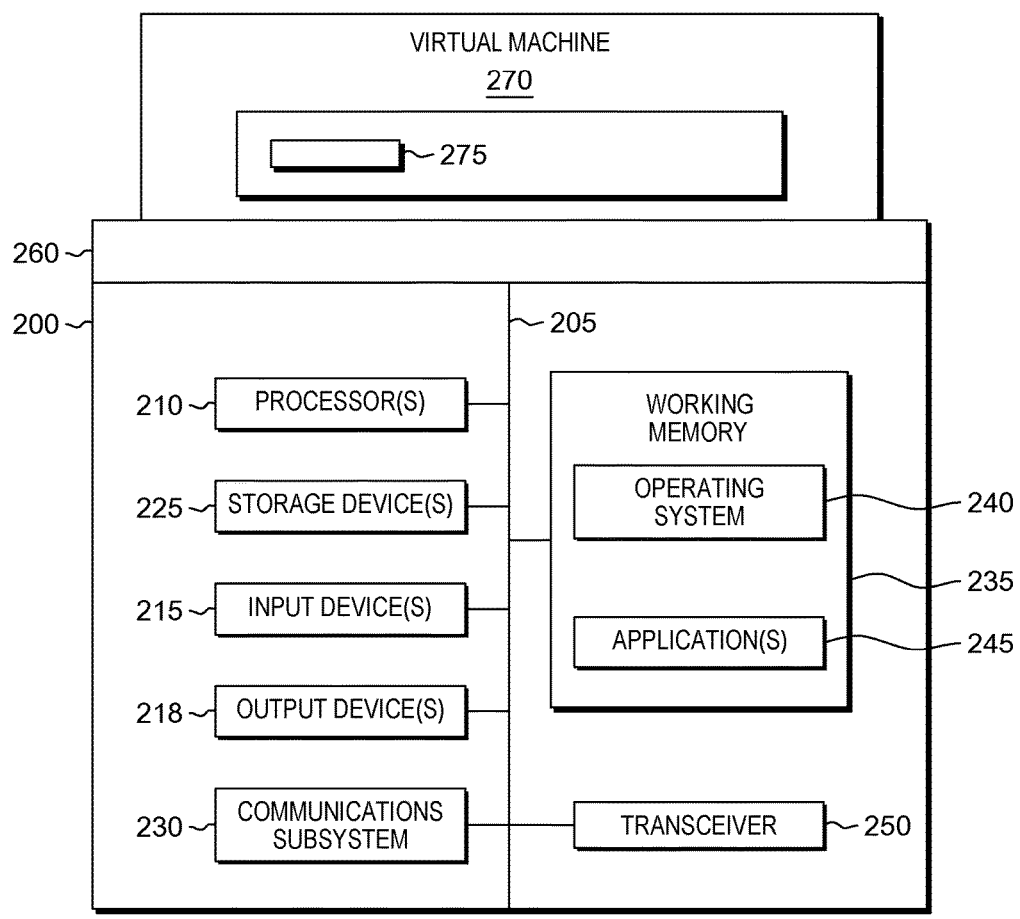
FIG. 2 further shows that in various embodiments disclosed herein, the computing device 200 can represent some or all of the components of the EISC servers 101*a*, database (s) 101*b*, active directory of users or organizations 101*c*, policy engines 101*d*, AIISO plug-in server 101*e*, AIISO database 101*f*, AIISO active directory of user or organizations 101*g*, AIISO policy engine server 101*h*, real-time authorization server(s) present in AIISO 120, Authorizing Entity server 130*a*, personal computer 130*b* and mobile device 130*c*.

FIG. 2 illustrates an exemplary computing device or hardware platform incorporating parts or all of the devices employed in practicing the embodiments of the disclosure. The computing device as illustrated in FIG. 2 may be incorporated as part of any computerized system disclosed herein. For example, the computing device can represent some or all of the components of the JIISN identity system service 100 such as the EISC servers 101*a*, database 101*b*, active directory of users or organizations 101*c*, policy engines 101*d*, JIISN policy engine server(s) 100*a*, AIISO plug-in server 101*e*, AIISO database 101*f*, AIISO active directory of user or organizations 101*g*, AIISO policy engine server 101*h*, real-time authorization server(s) present in the AIISO 120. The computing device may be any computing system 200 with one or more input sensory unit or input devices 215 such as sensors and one or more input/output devices such as a display unit or a touch screen. Examples of a computing device 200 include, but are not limited to, servers, PC computers, mainframes, video game consoles, tablets, smart phones, laptops, netbooks, wearables or other portable devices. FIG. 2 is meant only to provide a generalized illustration of various components, any or all of which may be utilized as appropriate. FIG. 2, therefore, broadly illustrates how individual system elements may be implemented in a relatively separated or relatively more integrated manner.

The computing device 200 is shown comprising hardware elements that can be electrically coupled via a bus 205 (or may otherwise be in communication, as appropriate). The hardware elements may include one or more processors 210, including without limitation one or more general-purpose processors and/or one or more special-purpose processors (such as digital signal processing chips, graphics acceleration processors, and/or the like); one or more input devices 215, which can include without limitation a camera, sensors (including photo/light detectors), a mouse, a keyboard and/or the like; and one or more output devices 218, which can include without limitation a display unit, a printer and/or the like. Output devices may be connected to a transceiver 250 for connection to a network and the like.

The computing device 200 may further include (and/or be in communication with) one or more non-transitory storage devices 225, which can comprise, without limitation, local and/or network accessible storage, and/or can include, without limitation, a disk drive, a drive array, an optical storage device, a solid-form storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computing device 200 might also include a communications subsystem 230, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 230 may permit data to be exchanged with a network (such as the network described below, to name one example), other computing devices, and/or any other devices described herein. In many embodiments, the computing device 200 will further comprise a non-transitory working memory 235, which can include a RAM or ROM device, as described above.

The computing device 200 can comprise software elements, shown as being currently located within the working memory 235, including an operating system 240, device drivers, executable libraries, and/or other code, such as one or more application programs 245, which may comprise computer programs provided by various embodiments, and/or may be designed to implement methods, and/or configure systems, provided by other embodiments, as described herein. In one implementation, components or modules of the figures may be performed using such software elements. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 225 described above. In some cases, the storage medium might be incorporated within a computing device, such as computing device 200. In other embodiments, the storage medium might be separate from a computing device (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computing device 200 and/or might take the form of source and/or installable code, which, upon compilation and/or installation on the computing device 200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 200 such as network input/output devices may be employed.

Some embodiments may employ a computing device (such as the computing device 200) to perform methods in accordance with the disclosure. For example, some or all of the procedures of the described methods may be performed by the computing device 200 in response to processor 210 executing one or more sequences of one or more instructions (which might be incorporated into the operating system 240 and/or other code, such as an application program 245) contained in the working memory 235. Such instructions may be read into the working memory 235 from another computer-readable medium, such as one or more of the storage device(s) 225. Merely by way of example, execution of the sequences of instructions contained in the working memory 235 might cause the processor(s) 210 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 200, various computer-readable media might be involved in providing instructions/code to processor(s) 210 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 225. Volatile media include, without limitation, dynamic memory, such as the working memory 235. Transmission media include, without limitation, coaxial cables, copper wire and fiber optics, including the wires that comprise the bus 205, as well as the various components of the communications subsystem 230 (and/or the media by which the communications subsystem 230 provides communication with other devices). Hence, transmission media can also take the form of waves (including without limitation radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a CD-ROM, any other optical medium, a Random Access Memory (RAM), a Programmable Read-Only Memory (PROM), Erasable Programmable Read-Only Memory (EPROM), a FLASH-EPROM, any other memory chip or cartridge, a carrier wave as described hereinafter, or any other medium from which a computer can read instructions and/or code.

The communications subsystem 230 (and/or components thereof) generally will receive the signals, and the bus 205 then might carry the signals (and/or the data, instructions, etc. carried by the signals) to the working memory 235, from which the processor(s) 210 retrieves and executes the instructions. The instructions received by the working memory 235 may optionally be stored on a non-transitory storage device 225 either before or after execution by the processor(s) 210.

FIG. 2 further shows that in alternative embodiments, the computing device can represent some or all of the components of the EISC servers 101a, database 101b, active directory of users or organizations 101c, policy engines 101d, JIISN policy engine server(s) 100a, AIISO plug-in server 101e, AIISO database 101f, AIISO active directory of user or organizations 101g, AIISO policy engine server 101h, real-time authorization server(s) present in AIISO 120, server 130a, pc 130b and mobile device 130c. The computing devices alternatively could function in a fully virtualized environment. A virtual machine is where all hardware is virtual and operation is run over a virtual processor. The benefits of computer virtualization have been recognized as greatly increasing the computational efficiency and flexibility of a computing hardware platform. For example, computer virtualization allows multiple virtual computing machines to run on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform 200, virtualization software 260 running on hardware platform 200, and one or more virtual machines 270 running on hardware platform 200 by way of virtualization software 260. Virtualization software 260 is therefore logically interposed between the physical hardware of hardware platform and guest system software 275 running "in" virtual machine 270. Memory 225, 235 of the hardware platform may store virtualization software 260 and guest system software 275 running in virtual machine 270. Virtualization software 275 performs system resource management and virtual machine emulation. Virtual machine emulation may be performed by a virtual machine monitor (VMM) component. In typical implementations, each virtual machine 270 (only one shown) has a corresponding VMM instance. Depending on implementation, virtualization software 275 may be unhosted or hosted. Unhosted virtualization software generally relies on a specialized virtualization kernel for managing system resources, whereas hosted virtualization software relies on a commodity operating system—the "host operating system"—such as Windows or Linux to manage system resources. In a hosted virtualization system, the host operating system may be considered as part of virtualization software 275.

Figure 3:
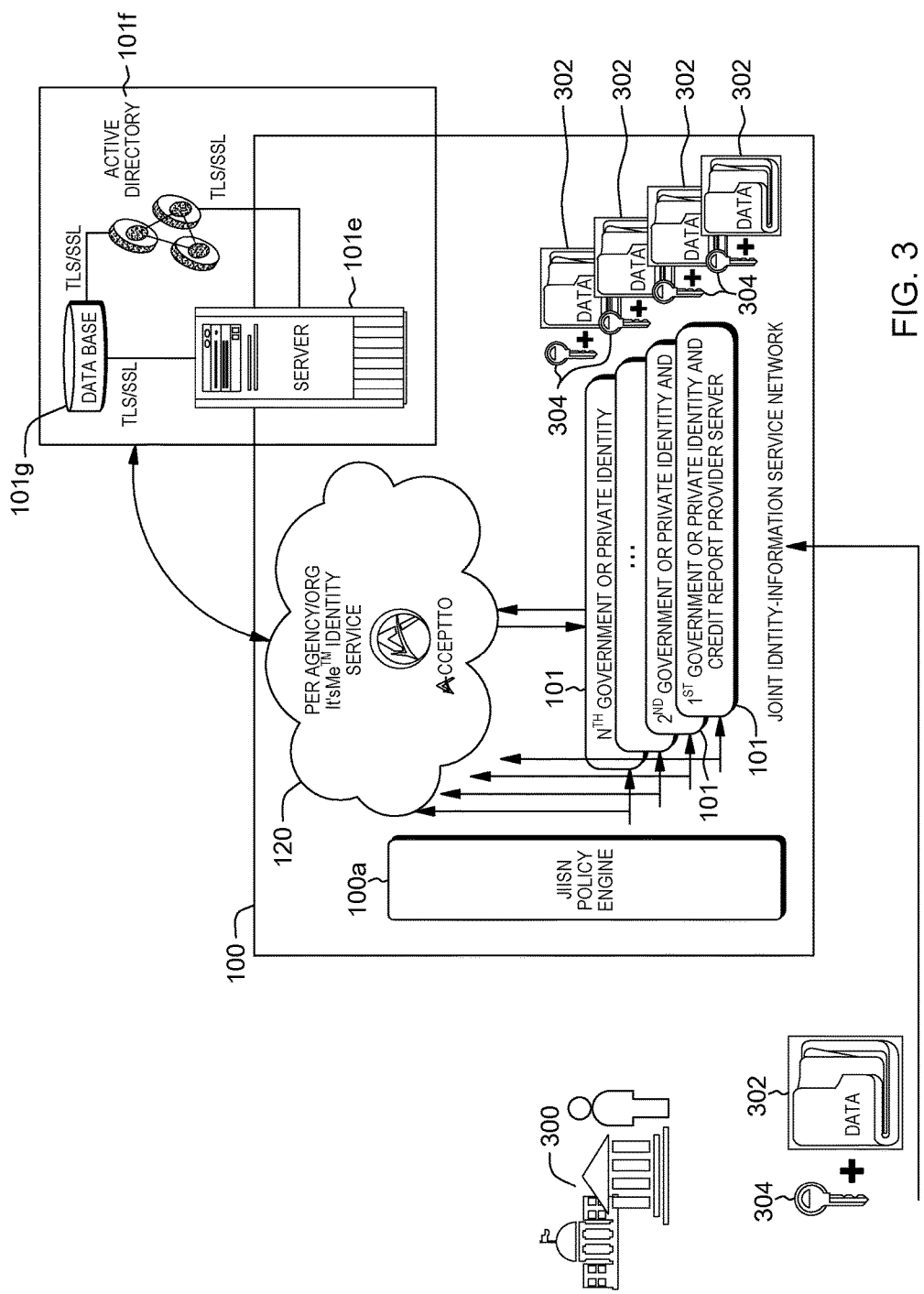
FIG. 3 discloses a Data Owner (or their agent) depositing a Data Commodity (or Data Commodities) or data stores at one of a plurality of ESICs 101 in the JIISN 100 and requests to be notified when other interested parties inquire about it (e.g. Requesting Entities).

Referring to FIG. 3, a Data Owner 300 deposits a Data Commodity 302 at one or more of a plurality of ESICs 101 in the JIISN 100 and requests to be notified when other interested parties inquire about it (and/or ask to purchase it). In alternative embodiments, a third party (not the Data Owner 300) can also deposit the Data Commodity 302. The third party could be the Data Owner's agent, someone who has a release the Data Owner 300 signed allowing the third party to do so, or some other party. In particular, when a Requesting Entity 110 makes a request to a trusted authority 101 that holds a Data Commodity 302 and an authorization is required from an Authorizing Entity 130 (e.g., Data Owner 300 or their agent) before it can be released by the ESIC 101 is a typical transaction contemplated in this disclosure. The Data Commodity 302 may be, for example, a SSN, DMV identification, protected health information (PHI), W-2, and the like. An encryption key 304 for each store of data is generated. The JIISN 100 described herein further allows for transfer from a data store source ESIC 101 to another requiring data store destinations ESIC 101 which is inquiring about the desired Data Commodity 302. JIISN system allows for real time authorization and notification to an Authorizing Entity 130 using dedicated secure hardware, a network and a set of security protocols which enable verification of specific security protocols meeting the level of assurance required based on certain predetermined policies, contextual intelligence and/or trust relationships between the ESIC 101 holding the Data Commodity 302 and the party to which the data store will be transferred. The authorization may be automatic or may require a real time notification and/or approval of an Authorizing Entity 130 (which is either the Data Owner 300 or an agent thereof).

As discussed above, during an authorization process to release a Data Commodity 302, a Requesting Entity queries one or more ESICs 101 which are part of the JIISN 100. The ESIC(s) 101 contacts the AIISO 120 associated with the Authorizing Entity 130 to obtain permission to release the Data Commodity 302. (In the case where the Data Owner 300 does not have an account with an AIISO, the ESIC(s) 101 will send the information to the Data Owner 300 or their agent on how to set up an account with an AIISO 120. After the AIISO account is set up, the Data Owner or their agent may then confirm the release of the Data Commodity 300 directly with the EISC(s) 101). The mobile device (or mobile devices) 130c associated with the Authorizing Entity 130 may present to the AIISO 120 a number of independent multi-factors to prove that the Authorizing Entity 130 (person or machine) for the Data Commodity 302 is indeed the Data Owner (or agent) 300 of the Data Commodity.

Figure 4A:
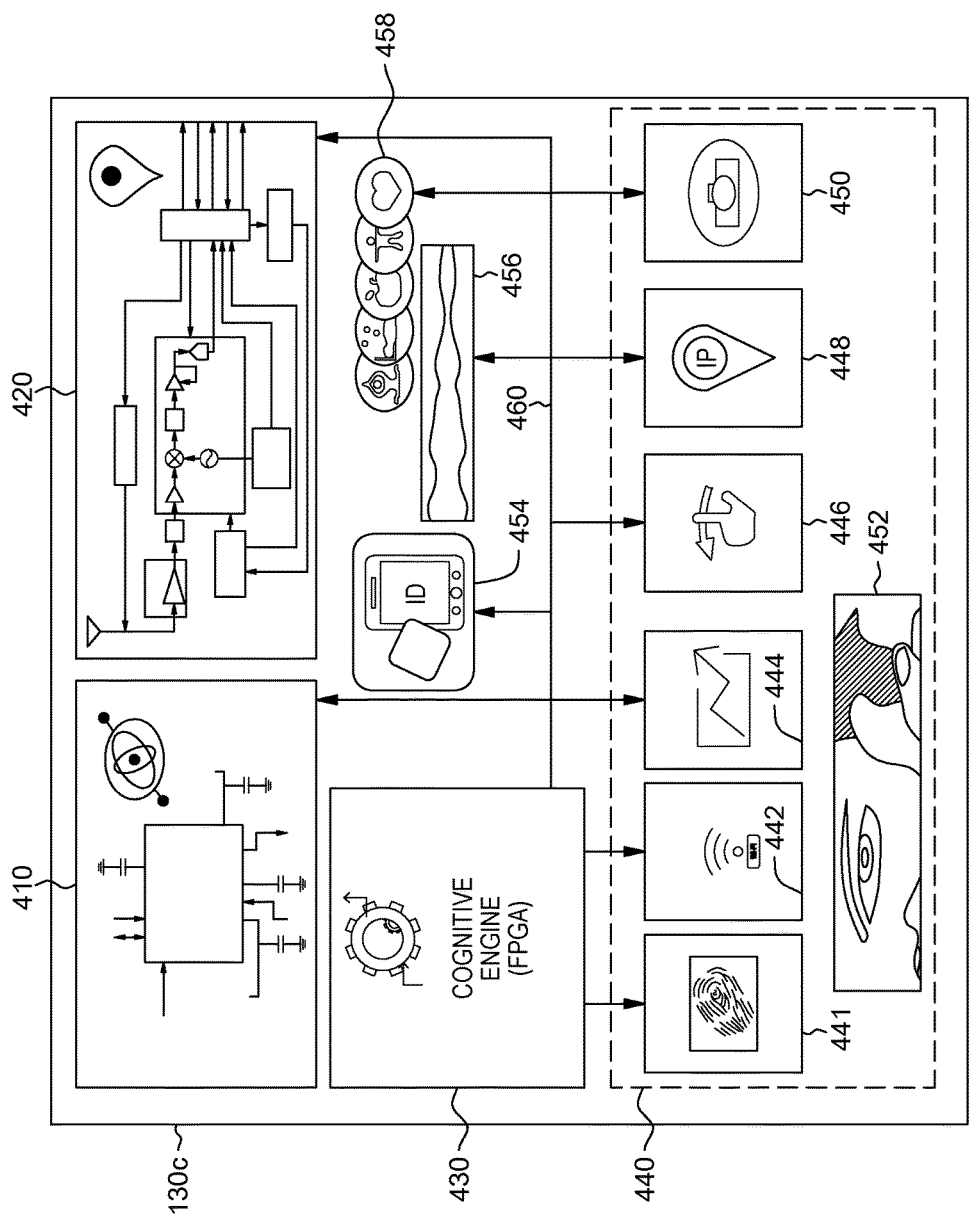
FIGS. 4A and 4B illustrate elements and operation of the mobile device 130c in more detail.
Figure 4B:
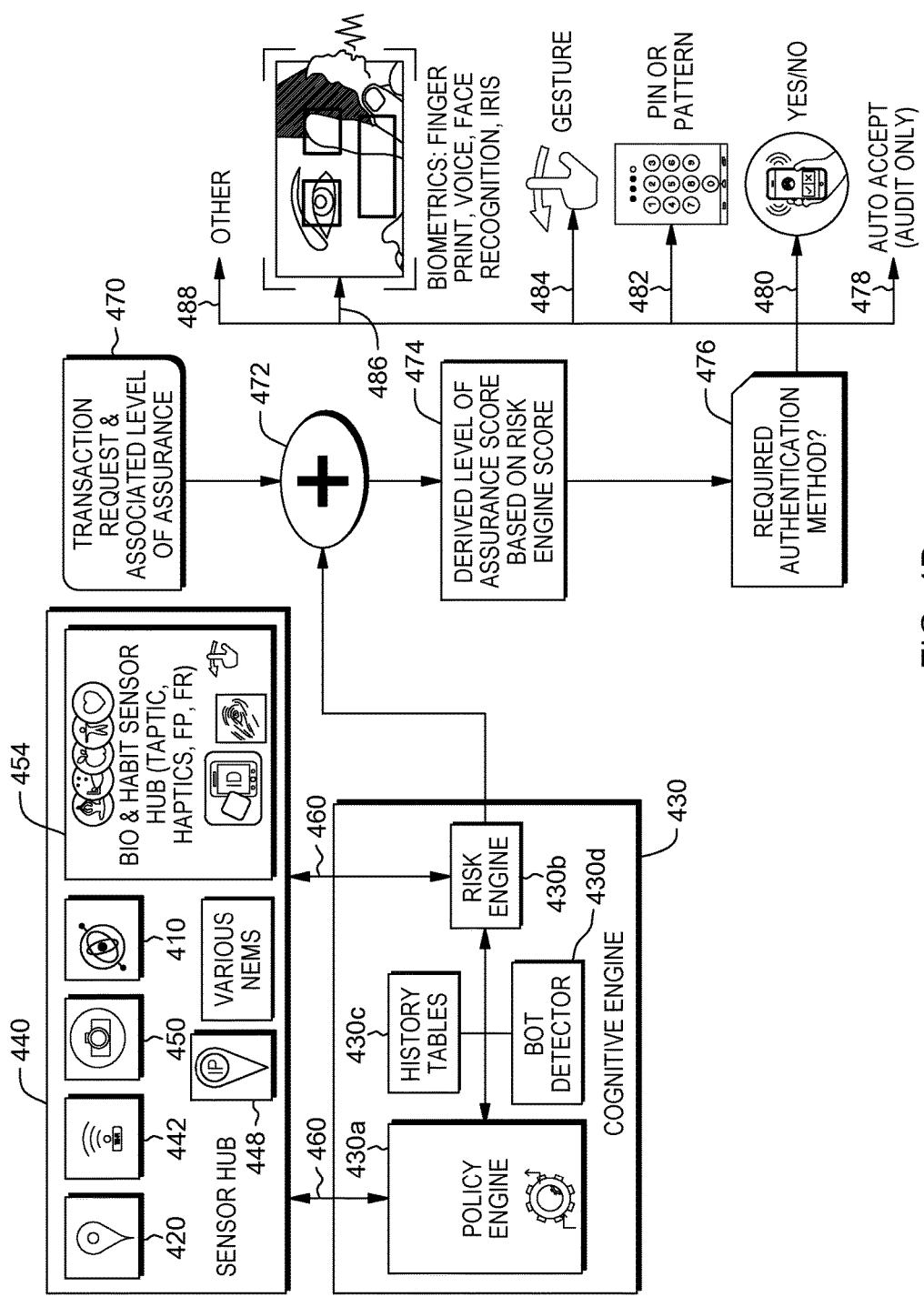

FIGS. 4A and 4B illustrate an example of a mobile device 130c that may be used with the JIISN 100 in more detail. The mobile device 130c may be a cellphone, a wireless personal digital assistant, wireless tablet, wireless smart watch, electronic patch (or tattoo) and any other device capable of wireless communications. The mobile device 130c besides including the standard transceiver equipment of a cellphone may also includes a gyroscope 410, global positioning satellite (GPS) 420 and a cognitive engine 430. Cognitive engine 430 may be a field programmable gate array (FPGA) connected to a sensor hub 440 (including a series of nano-electromechanical systems (NEMS)). In an alternative embodiment, instead of an FPGA the functions of the Cognitive Agent may be implemented in software.

As shown in FIG. 4A, a biometric and habit sensor and application hub 440 is capable of receiving an analyzing the inputs from a plurality of sensors and applications. The hub 440 may include taptic, haptics, finger prints, location, habits and facial recognition sensing capability. The sensors in the hub 440 may include custom nanoelectromechanical systems (NEMS) may also be used. The sensors may be discrete or integrated into the sensor hub 440. The information from the hub 440 is collected and analyzed in the cognitive engine 430 to provide a risk score in evaluating the level of verification of the operator of the mobile device 130c and whether he or she (or machine entity) is the correct Authorizing Entity 130. The hub 440 may include a finger print input sensor 441 for a first biometric input. The hub may include a wireless detection sensor 442 that may be used to analyze a variety of wireless communication parameters such as Service Set Identifier (SSID). Reference item 444 indicates an analytical engine which is configured to receive input from the other sensors in the hub 440 to monitor the Authorizing Entity's spatiotemporal and behavior patterns and habits to determine if the owner of the mobile device 130c is the correct Authorizing Entity 130. For example, habits might include environmental patterns of the owner of the mobile device 130c such as the time the owner wakes up, arrives at the gym, and/or arrives at work and the like. Sensor 446 is used to measure gestures regarding how the Authorizing Entity 130 handles the mobile device 130c. For example, these gestures might include how the operator swipes the screen of the mobile device 130c with their finger including pressure, direction, right handed vs. left handed, and the like. In addition, sensor 446 may measure the electromagnetic signature of the operating environment of the mobile device 130c to determine if it fits a profile for the Authorizing Entity 130. For example, the SIM card and mobile identification of the mobile device 130c combined with the background electromagnetic factors may all be used in a verification process that the operator of the mobile device 130c is an Authorizing Entity 130. Reference item 448 measures an IP address being used by the mobile device 130c and may use a look up feature to verify the mobile device 130c is in a region typically occupied by the Authorizing Entity 130. Camera 450 may be used for facial recognition of the Authorizing Entity 130 and other biometric inputs such as a tattoo or the like. In addition, the camera 450 may be used to capture a background of the operator of the mobile device 130c to determine if it is an environment in which the Authorizing Entity 130 oftentimes is found (e.g., a picture hanging behind the operator of the mobile device 130c may conform to an Authorizing Entity profile). Iris scanner 452 may be used to confirm through an eye scan the identity of the mobile device operator. Reference item 454 indicates the mobile device 130c "unique identification" which may be tied to an AIISO 120 account. The unique identification may be a SIM card number and all associated unique signatures, an International Mobile Equipment Identification (IMEI) number or an Apple® identification, a telecommunications carrier (e.g., AT&T®, Verizon®), battery serial number or the like. Ambient noise sensor 456 measures the noise levels surrounding the mobile device 130c including noises from nature and manmade noises (including communication equipment produced radio frequency noise). Ambient sensor 456 may also be able to measure a speaking voice to create a voiceprint to be able to verify that the Authorizing Entity is authentic. Reference item 458 is an application that measures the "wellness" of a mobile device 130c owner including heart rate, sleep habits, exercise frequency, and the like to gather information on the mobile device 130c owner's lifestyle to contribute to verification decisions. Bus 460 couples the sensors and applications of the hub 440 to the cognitive engine 430.

FIG. 4B shows a more detailed view of the cognitive engine 430. The cognitive engine 430 includes a policy engine 430a, a risk engine 430b, history tables 430c, and bot detector 430d. The policy engine 430a sets the factors in evaluating the risk when receiving input from the sensors and applications on the hub 440. The risk engine 430b calculates the information received from the hub 440 and makes a determination regarding a risk score in regard to the current operator of the mobile device 130c. The history tables 430c record the personal habits of the mobile device 130c owner. The bot detector 430d determines whether a computer program is attempting to trick the mobile device 130c into thinking a legitimate Authorizing Entity 130 by simulating the device owner activities and is attempting to conduct a verification without the actual owner. In one implementation, the bot detector 430d monitors which applications typically operate on the mobile device 130c and if it discovers a new application residing and running beyond the routine, it raises a risk level warning that something unusual is happening with the mobile device 130c. Overall, the cognitive engine 430 assists in determination of the type of authentication required based on risk score. The output of the cognitive engine 430 is added to a transaction requested along with the associated Level of Assurance (LOA) 470 in step 472. In step 474, there is a derived LOA score based on the risk engine (430b) score from the cognitive engine 430. In step 476, it determines whether an additional and/or higher level of authentication is required. Reference numerals 478 through 488 indicate an increasing higher level of authentication that may be required for the approval to be accepted by the AIISO 120. Reference item 478 is the lowest level with automatic approval; item 480 is a mobile device 130c yes or no; item 482 is a pin or a pattern be received for an approval; item 484 is a proper gesture(s) to obtain approval; item 486 is a much higher level whereby biometrics such as one of or all of a plurality of biometric criteria have to be met such as a fingerprint, facial recognition scan, voice match and iris scan inputs; and item 488 indicates an even higher level of authentication may be necessary.

Figure 5:
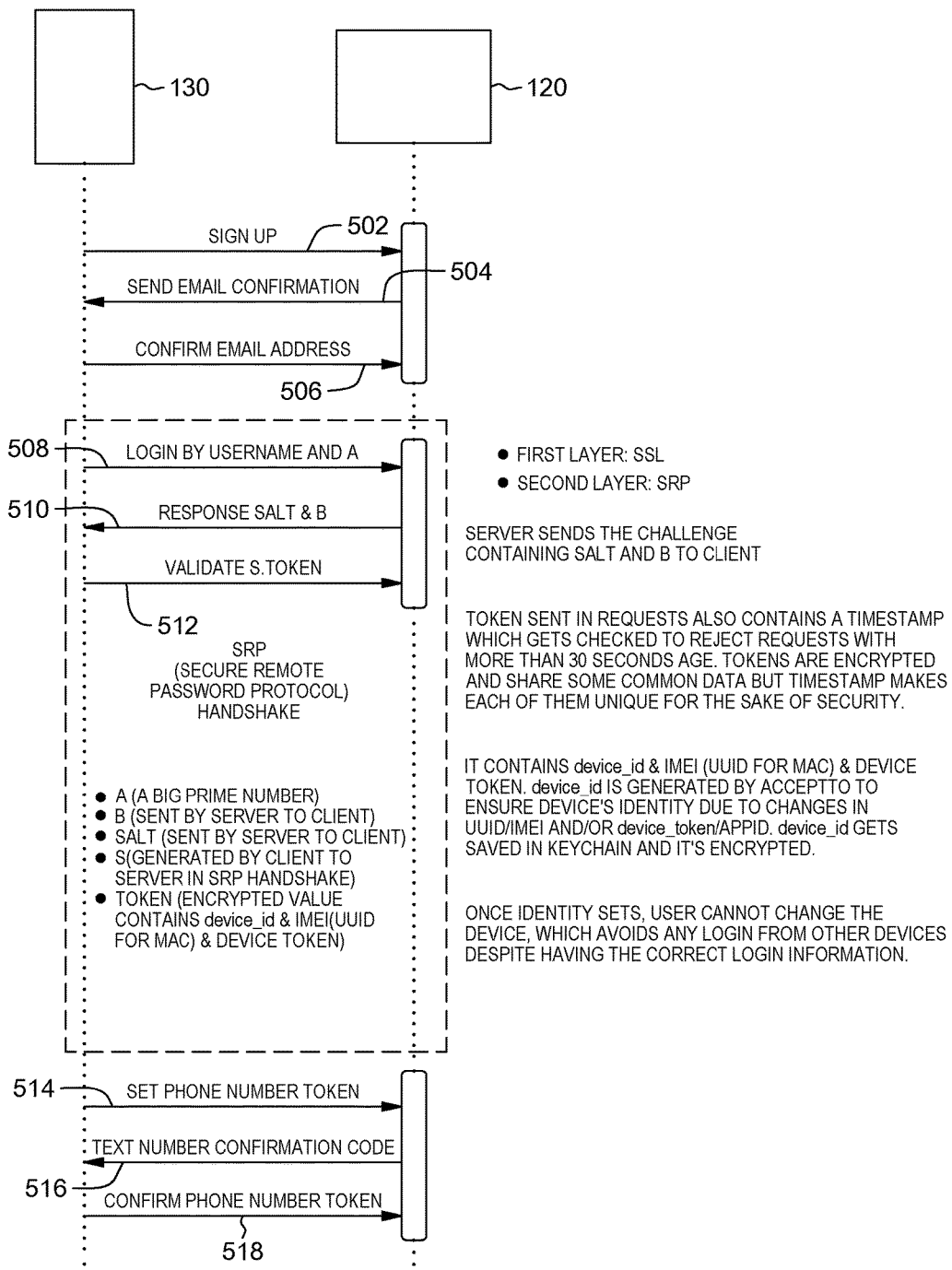
FIG. 5 illustrates an Authorizing Entity 130 at a server 130a, personal computer 130b and/or mobile device 130c initiating registration with an AIISO 120.

FIG. 5 illustrates an Authorizing Entity 130 at the server 130a, personal computer 130b and/or mobile device 130c initiating registration with the AIISO 120. The Authorizing Entity 130 will typically be a Data Owner 300, but it also may be their agent or another entity allowed to authorize release of the data (e.g., one of the ESICs 101 in the JIISN 100). The Authorizing Entity 130 can be an individual user, plurality of users, or an enterprise. As discussed previously, the Authorizing Entity 130 can be a human or a machine (e.g., server). The AIISO 120 receives the request for registration and configures a specific policy for notification and authorization of identity requests of a desired identity service ESIC 101 (or plurality of services) of the JIISN 100 associated with the targeted user identification. In FIG. 5, in step 502 the Authorizing Entity 130 signs up with the AIISO 120 at a secure server(s) controlled by the AIISO 120. In step 504 an email confirmation is sent to the Authorizing Entity 130. In step 506, the Authorizing Entity 130 confirms the email address. In steps 508 to 512 a secure remote protocol (SRP) handshake occurs between the Authorizing Entity 130 and a secure server of the AIISO 120. An SRP handshake is an augmented password-authenticated key exchange (PAKE) protocol. In step 508, the Authorizing Entity 130 logs into the AIISO 120 authorization server by username (e.g., email address) and a random one time ephemeral key A (e.g., a big prime number). The AIISO authorization server in step 510 sends a challenge-response containing a salt (i.e., random data that is used as an additional input to a one-way function that hashes a password) and a random one time key B. In the challenge is a token which contains a timestamp which gets checked in to reject requests with more than N seconds (e.g., 60 seconds) ago. The token is encrypted and shares some common data but time stamp makes each of them unique elevating security of the transaction. In step 512, a device identification, International Mobile Station Equipment Identity (IMEI), and device token are generated by the Authorization Entity 130. Once the identity is set, an Authorization Entity 130 cannot change the mobile device 130c which avoids any login from other devices despite having the correct login and even password information. In step 514, a phone number token is transferred to the AIISO authorization server. In step 516, a text confirmation code is sent from the AIISO authorization server to the Authorization Party 130. The Authorizing Party 130 then confirms the phone number token with the AIISO authorization server.

The real-time authorization server at the AIISO 120 identifies the registered Authorizing Party 130 including delivering notification for the identity services requested by the Requesting Entity 110 based on the ESIC policy engine 101d setting through the EISC 101 (and alternatively user mobile rules) or based on the JIISN policy engine 100a. The AIISO 110 may use a number of the independent factors to prove that the presenter/Authorizing Party (person or machine in case of M2M transactions) 130 of an identity is indeed the owner of the identity using the phone or smart devices (e.g., smart watch) 130*a*. This allows the data/identity owner to be "virtually" present for every single transaction that requires authentication and real-time authorization when desired. The benefits of this system include convenience, control, and peace of mind.

Real-time transaction authorization for transactions may be configurable based on data owner, Authorizing Party and enterprise policies. Policies can be set based on the type of transaction (e.g. secure login, VPN, financial transaction) and the desired level of security. It allows for switching between real-time authorization vs. notification and auto-approve based on contextual information like location, known device, type of transaction, the amount of transaction, etc., hence offering highest level of security with the least amount of friction and a perfect real-time audit trail all at the user's fingertips.

The authorization may be made by using a mobile device 130*c* such as a phone as a second factor to authenticate and authorize transactions preventing hackers and fraudsters even if they have access to the user's passwords or credit card information. It should be noted that the mobile device 130*c* is being in this disclosure as a "variable". Other methods of confirming identity in addition to the mobile device 130*c* may include electronic tattoo or patch, wireless smart watch, some type of wireless tablet or device, a personal computer, server and the like. Notification may be made by SMS, eMail, phone calls or token exchange in case of M2M transactions. It is possible to configure for auto-accept all or certain transaction for certain amount of time. This feature combined with amount limit can be a useful policy for when users do not want to be bothered by real-time authorization for certain amount of time but yet want to make sure they put a cap on the size of transactions.

Figure 6:
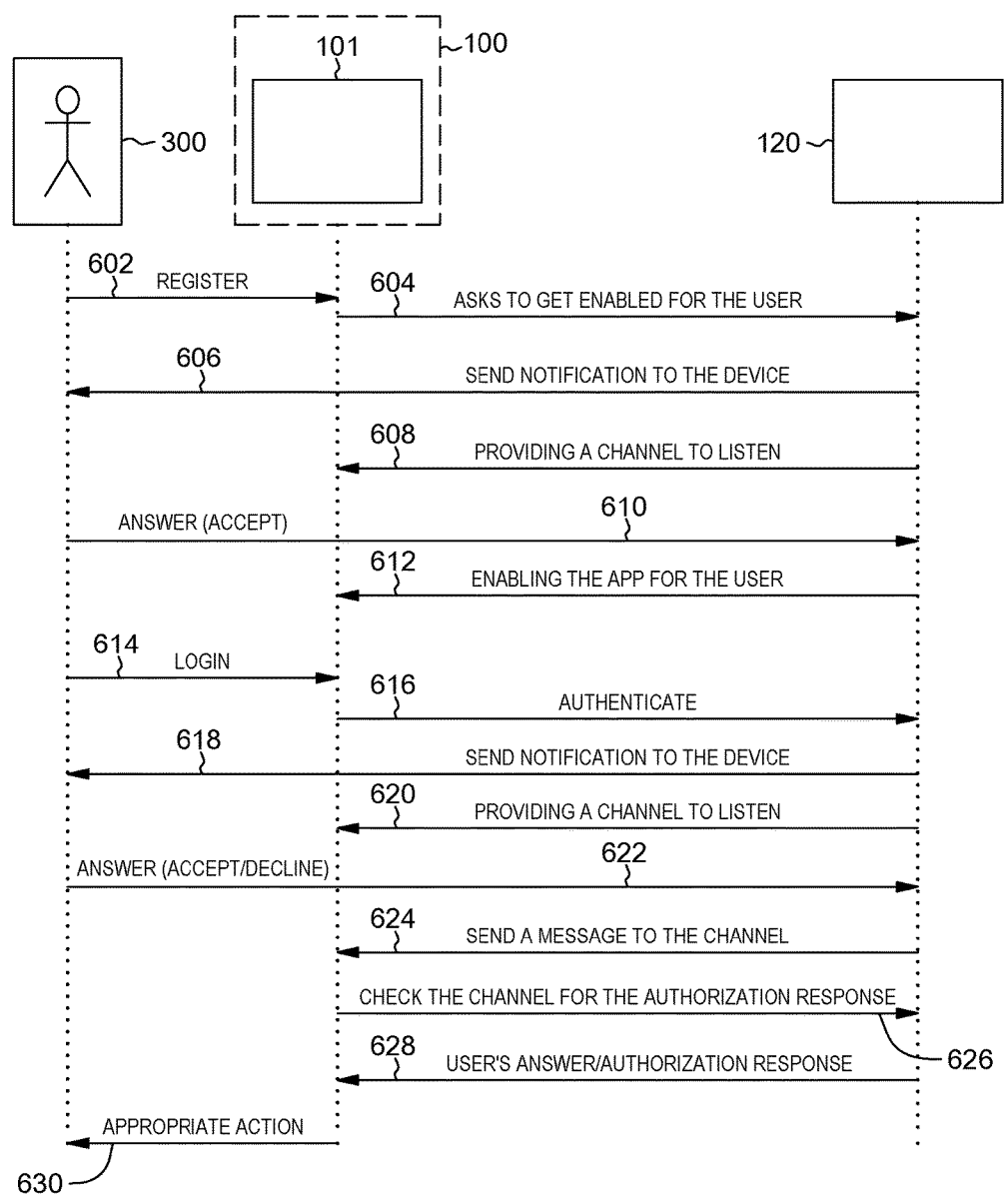
FIG. 6 shows a Data Owner 300 registers with an EISC policy engine 101d at a EISC 101 in the JIISN 100.

Referring to FIG. 6, a Data Owner 300 registers at step 602 with a policy engine 101*d* at a EISC 101 in the JIISN 100. (Alternatively, these steps could represent the Data Owner 300 registering with a JIISN policy engine 100*a*). In step 604, an EISC asks the secure identity service organization (AIISO) 120 to be enabled for the Data Owner 300. In step 606, the AIISO 120 sends notification to the Data Owner 300 and in step 608 provides a channel to listen for a response. In step 610, an answer is sent (e.g., accept) from the Authorizing Entity mobile device 130*c* to the AIISO 120. In step 612, in response to an accept answer, the AIISO 120 contacts the EISC 101 in the JIISN 100 to enable the application for the Data Owner 300. In step 614, the Data Owner 300 logins into a policy engine 101*d* at the EISC 101. In step 616, the EISC 101 authenticates the Data Owner 300 identity with the AIISO 110. In step 618, notification is sent to the mobile device 130*c* of the Data Owner 300 and in step 620 it provides a channel to listen. In step 622, an answer is sent from the mobile device 130*c* to the AIISO 120. In step 624, a message is sent to the channel to listen while in step 626, the EISC 101 is checking the channel for the authorization response. In step 628, a data owner's answer/authorization response is sent to the EISC 101. The JIISN 100 takes the appropriate action in step 630.

Figure 7:
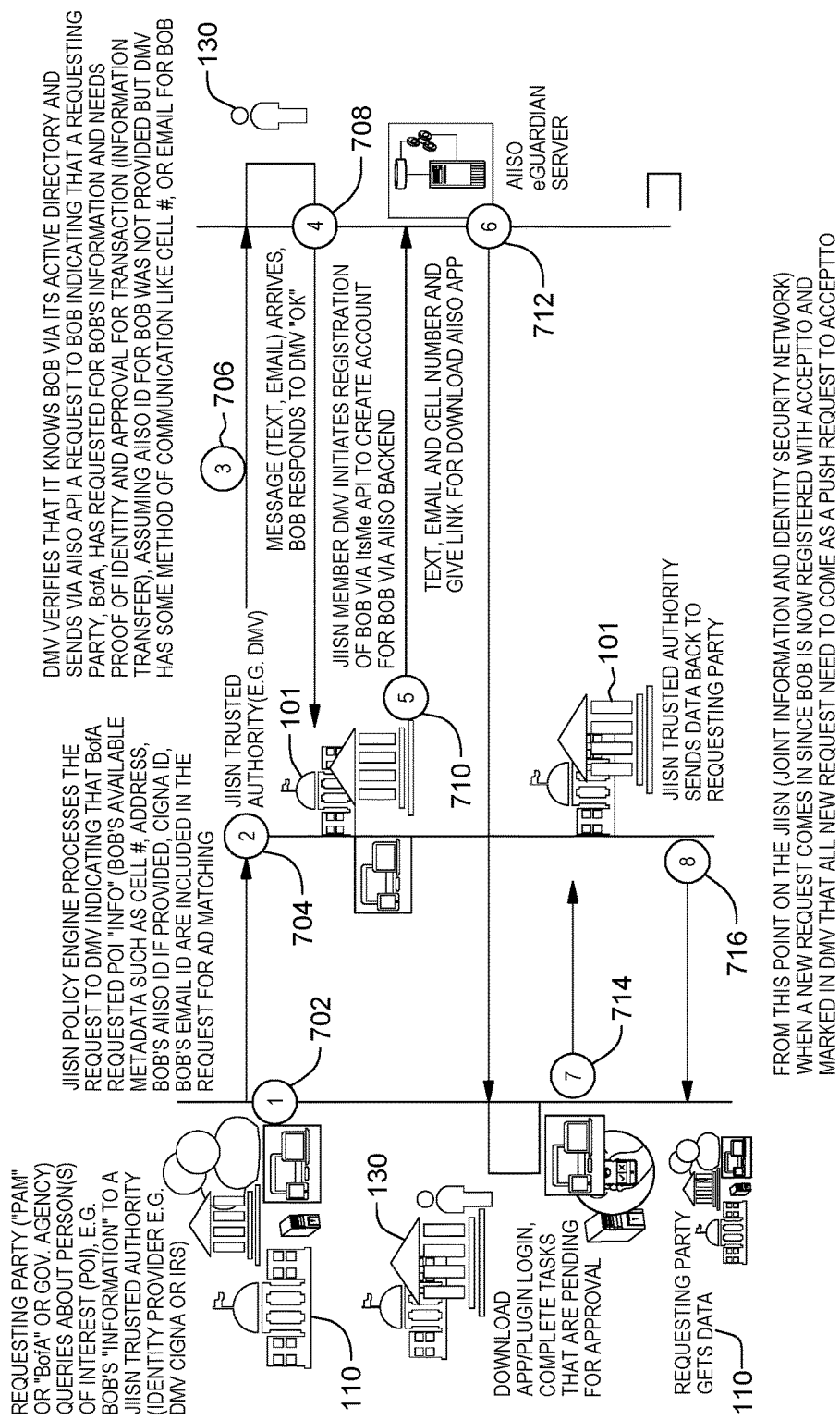
FIG. 7 illustrates a Requesting Entity (e.g., "Pam" of Bank of America) 110 initiating a transaction requiring identity verification of a Data Owner (e.g., "Bob") with an ESIC 101 (e.g., DMV) that is part of a JIISN 100.

FIG. 7 illustrates a Requesting Entity (e.g., Bank of America) 110 initiating a query about a person of interest (e.g., "Bob") and their information (e.g., SSN, credit report) to a JIISN trusted authority 101 (e.g., DMV) in step 702. The JIISN policy engine 100*a* processes the request to DMV indicating that Bank of America is requesting person of interest information in step 704. The request may include the person of interest's available metadata such as mobile phone number, physical address, the person of interest's AIISO identification if provided, email address. The metadata is used to see if there is a match in the active directory of the trusted authority 101 such as the DMV for an account of the person of interest. The DMV 101 in step 706 verifies that it has a record for Bob in its active directory and sends via the AIISO application program interface (API) a request to the person of interest Bob indicating that a Requesting Entity 110, Bank of America, is requested for Bob's information and needs proof of entity and approval for transaction (information transfer). Assuming AIISO identification for Bob was not provided or Bob does not have an AIISO account yet but the trusted authority 101 DMV has a method of communication such as a mobile device phone number or email for the person of interest Bob. In this case, the trusted authority contact 101 contacts Bob to see if he wants to set up an AIISO account. Bob is also the Authorizing Entity 130 and in step 708 he responds to the trusted authority DMV 101 with an okay that he is willing to open an AIISO account. In step 710, the DMV 101 initiates registration of Bob with the AIISO 120 (e.g., Acceptto™) via an application program interface (API) provided by the AIISO 120 to create an account for Bob. Bob's information such as text, email and mobile device information are provided to the AIISO 120 which can then contact Bob with a link to download the AIISO 120 application for his mobile device 130*c* in step 712. Bob downloads the AIISO application and/or plug in and completes the tasks pending for approval by the AIISO 120. In step 714, the approval is provided by Bob to the AIISO 120 for the release of his Data Commodity 132. The AIISO then signals the DMV trusted authority 101 for the release of Bob's Data Commodity 132. In step 716, the trusted authority 101 sends Bob's Data Commodity 132 to the Requesting Party/Bank of America 110. From this point on, now that Bob is registered with the AIISO 120 and JIISN 100, when a new request comes in, it can proceed as a push request to Bob's mobile device for approval without the need for Bob to re-register with the AIISO 120.

Figure 8:
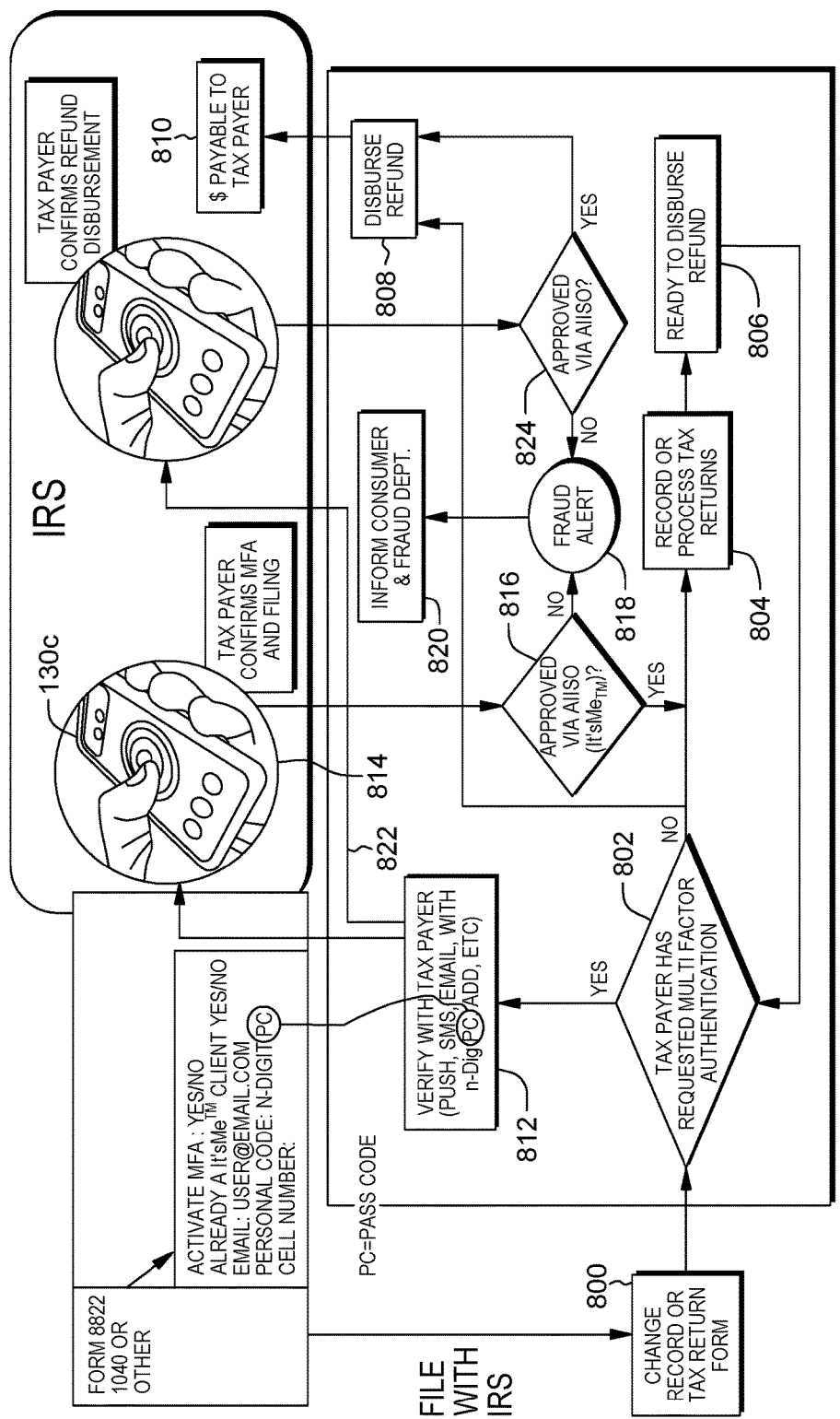
FIG. 8 shows an authentication and authorization of a) filing a tax return with the Internal Revenue Service (IRS) and b) disbursement of funds to the taxpayer.

FIG. 8 shows an authentication and authorization of a) filing a tax return (IRS Form 1040) or account change form (IRS Form 8822) with the Internal Revenue Service (IRS) (i.e., ESIC 101) and b) disbursement of funds to the taxpayer (i.e., Data Owner 300). A joint environment at the government level or hybrid of private and public is used (e.g., JIISN 100). In step 800, a taxpayer files tax return (e.g. 1040 or state tax return) or an address change form (e.g. form 8822) account change form. In step 802, a determination is made whether the taxpayer has requested MFA. If no, in step 804, if a tax return form or address change, it is processed and step 806, the IRS is ready to disburse the refund the tax return. The process flow goes back to step 802 to check again to see if the taxpayer had requested MFA and if not, then to step 808 to disburse refund and in step 810 money is made payable to taxpayer. In an alternative path, step 800 the return is filed and in step 802 a determination is made about the taxpayer requesting MFA. If yes, in step 812 a verification is made with taxpayer via push notification, text message, email, and/or with an N-digit passcode. In step 814, a taxpayer makes a request for a MFA of the filing using, for example, a mobile device 130*c* securely linked to AIISO 120. In step 816, if MFA response is a decline/no then a fraud alert is determined in step 818 and in step 820, the consumer and fraud department is informed. In 816, if MFA response is an approved/yes, steps 804 of processing tax return and the 806 disbursement calculation and preparation leading to the disbursement of the actual funds. A determination is made again in step 802 if taxpayer has made a request for MFA for disbursement of funds (as well as confirmation of the filing of a return and/or change of address form). If yes, step 812 is repeated with the verification to the taxpayer. In step 820, the taxpayer confirms the refund disbursement. The confirmation is again confirmed in step 824 through a secure communication with the AIISO 120. If no, the fraud alert again in step 818 and if yes, then money is disbursed and sent to the taxpayer in steps 808 and 810 to the address requested.

A system comprising: a public or private identity and credit report server configured to be communicatively coupled with a network; a network with number of methods of communicating from a consumer's request or the agent of, receiving a request for identity verification and services associated with the transaction such as a credit report, employment verification, immigration and citizenship status, insurance policy and identification, personal health data, passport verification, tax filing or change of address with the identity data store provider such as the IRS, Department of Homeland Security (DHS) E-Verify system; and performing verification based on policies that are configured by the plurality of the consumer and the agencies of interest and deciding to automatically reject (in case of locking the identity of interest such as SSN, passport number, drivers license number), request for authorization, notification only or no action based on set of configured policies.

Advantages of the some of the embodiments disclosed herein include the consumer based access control of identity information (e.g., Social Security identity information—SSN, EIN, Driver License Number, Medicaid/Medicare, policy number, etc.). Aspects of the embodiments disclosed herein include the ability of a user to lock and/or suspend, require real time authorization or notification for use of one's identity, provide real time notification, enable (or disable in case of locking-freezing account) authorization requests for the user identity in various government or private databases (DBs) for a given period of time and the ability to control the associated benefits and services of the identity owner by the owner based set of identity owner policies. The temporarily enable/disable authorization requests to the user identity in various government or private databases via a real time authorization server (e.g., "eGuardian") frame work prevents fraud and puts consumers in control of the usage of their identity in real time. The system and method disclosed herein may be used by agencies and private sector companies that use SSNs such as E-Verify, SSN Verification Service (SSNVS), W2 forms, Health, Social Security office for pension, Health & Human Services, Immigration & Naturalization, and/or the Department of Motor Vehicles, Veterans Administration, Department of Homeland Security.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be feature of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

The invention claimed is:

1. A computer implemented method for access control for identity information requests, the method comprising:

configuring specific policies for a policy engine in an identity service entity in a Joint Identity and Information Service Network (JIISN) server framework which manages a plurality of identity service entities, wherein the specific policies may include real-time notification, real-time authorization, lock for duration of time and identifiers proving the identity of the authorizing party including contextual factors of the authorizing party;

configuring the JIISN for detection and verification of identity information requests against an active directory of the plurality of identity service entities and wherein the JIISN server framework includes at least one of the plurality of identity service entities who have been opted in by an identity information owner for notification, multi factor authentication and authorization of at least one of the identity information requests and wherein the at least one of the plurality of identity service entities has a real time authorization plug-in for communicating with a real time authorization server;

receiving at the at least one of the plurality of identity service entities the at least one identity information request from a requesting entity which confirms a unique identification and reference identity of the identity information owner;

processing and analyzing for abnormalities the at least one identity information request in the JIISN server framework;

computing the required action based on the specific policies;

communicating with the real time authorization server which identifies an authorizing party based on the specific policies and communicates with the authorizing party in real time through an out of band notification; and receiving an authorization or decline of the at least one identity information request from the real time authorization server forwarded from the authorizing party.

2. The method of claim 1 wherein the at least one identity information request is for one of the following: a school member identification; a club member identification; a Social Security Number; an Employee Identification Number (EIN); a Driver License; a Passport Number; a credit report; a health identification; and a student identification.

3. The method of claim 1 wherein the specific policies may further include at least one of the following: automatic authorization and automatic rejection.

4. The method of claim 1, wherein the identifiers may further include at least two of the following: user pin code, passwords, biometric, and habits.

5. The method of claim 1 wherein the configuration of the specific policies are set by a remote mobile control system.

6. The method of claim 1 wherein the policy engine of the JIISN server framework manages each of the specific policies for each of the identity service entities and for each identity information owner identity.

7. The method of claim 1 wherein the policy engine can report the failed versus successful identity information request attempts to the identity information owner.

8. The method of claim 1 wherein the at least one identity information request results in identity information verification requested by one of the plurality of identity service entities serving another of the plurality of identity services entities.

9. The method of claim 1 wherein the at least one identity information request results in identity information verification requested by one of the plurality of identity service entities serving a second identity service entity located outside the JIISN server framework.

10. A computer implemented method for access control for data commodity transfer requests, the method comprising:

configuring specific policies for a policy engine in an identity service entity of a Joint Identity and Information Service Network (JIISN) server framework which manages a plurality of identity service entities, wherein the specific policies may include real-time notification, real-time authorization, lock for duration of time and identifiers proving the identity of the authorizing party including contextual factors of the authorizing party;

configuring the JIISN for detection and verification of data commodity requests against an active directory of the plurality of identity service entities, wherein the JIISN server framework includes at least one of the plurality of identity service entities who have been opted in by a data commodity owner for notification, multi factor authentication and authorization of at least one of the data commodity requests and wherein the at least one of the plurality of identity service entities has a real time authorization plug-in for communicating with a real time authorization server;

receiving at the at least one of the plurality of service entities the at least one data commodity request from a requesting entity which confirms a unique identification and reference identity of the data commodity owner;

processing and analyzing for abnormalities the at least one data commodity request in the JIISN server framework;

computing the required action based on the specific policies;

communicating with the real time authorization server which identifies an authorizing party based on the specific policies and communicates with the authorizing party in real time through an out of band notification; and receiving an authorization or decline of the at least one data commodity request from the real time authorization server forwarded from the authorizing party.

11. The method of claim 10 wherein the at least one data commodity request is for one of the following: a school member identification; a club member identification; a Social Security Number; an Employee Identification Number (EIN); a Driver License; a Passport Number; a credit report; a health identification; and a student identification.

12. The method of claim 10 wherein the specific policies may further include at least one of the following: automatic authorization and automatic rejection.

13. The method of claim 10 wherein the identifiers may further include at least two of the following: user pin code, passwords, biometric, and habits.

14. The method of claim 10 wherein the configuration of the specific policies are set by a remote mobile control system.

15. The method of claim 10 wherein the policy engine of the JIISN server framework manages each of the specific policies for each of the plurality of identity service entities and for each data commodity owner.

16. The method of claim 10 wherein the policy engine can report the failed versus successful data commodity request attempts to the data commodity owner.

17. The method of claim 10 wherein the at least one data commodity request results in identity information verification requested for data commodity transfer by one of the plurality of identity service entities serving another one of the plurality of identity service entities.

18. The method of claim 10 wherein the at least one data commodity request results in identity information verification requested for data commodity transfer by one of the plurality of identity service entities serving a second identity service entity located outside the JIISN server framework.

* * * * *